US008323391B2

(12) United States Patent
Banerjee et al.

(10) Patent No.: US 8,323,391 B2
(45) Date of Patent: Dec. 4, 2012

(54) OMNIDIRECTIONAL STRUCTURAL COLOR PAINT

(75) Inventors: Debasish Banerjee, Ann Arbor, MI (US); Songtao Wu, Ann Arbor, MI (US); Minjuan Zhang, Ann Arbor, MI (US); Masahiko Ishii, Okazaki (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/974,606

(22) Filed: Dec. 21, 2010

(65) Prior Publication Data

US 2011/0091658 A1  Apr. 21, 2011

Related U.S. Application Data

(63) Continuation-in-part of application No. 12/388,395, filed on Feb. 18, 2009, which is a continuation-in-part of application No. 11/837,529, filed on Aug. 12, 2007, now Pat. No. 7,903,339.

(51) Int. Cl.
*C09D 1/00* (2006.01)

(52) U.S. Cl. .................. 106/31.01; 106/31.06; 106/31.6

(58) Field of Classification Search ................ 106/31.01, 106/31.06, 31.6
See application file for complete search history.

(56) References Cited

U.S. PATENT DOCUMENTS

| 3,953,643 | A | * | 4/1976 | Cheung et al. | ................. | 428/220 |
| 4,705,839 | A | * | 11/1987 | Martin | ............................. | 528/49 |
| 4,753,829 | A | * | 6/1988 | Panush | ........................ | 427/385.5 |
| 6,242,056 | B1 | * | 6/2001 | Spencer et al. | ................ | 427/512 |
| 6,399,228 | B1 | | 6/2002 | Simpson | | |
| 6,433,931 | B1 | | 8/2002 | Fink et al. | | |
| 6,596,070 | B1 | * | 7/2003 | Schmidt et al. | ................ | 106/417 |
| 6,873,393 | B2 | | 3/2005 | Ma | | |
| 6,903,873 | B1 | | 6/2005 | Joannopoulos et al. | | |
| 2004/0252509 | A1 | | 12/2004 | Lin | | |
| 2005/0152417 | A1 | | 7/2005 | Lin | | |
| 2005/0264874 | A1 | | 12/2005 | Lin | | |
| 2006/0006402 | A1 | | 1/2006 | Hsieh et al. | | |
| 2006/0081858 | A1 | | 4/2006 | Lin et al. | | |
| 2006/0145172 | A1 | | 7/2006 | Su et al. | | |
| 2009/0153953 | A1 | | 6/2009 | Banerjee et al. | | |
| 2009/0161220 | A1 | | 6/2009 | Banerjee et al. | | |
| 2010/0064938 | A1 | * | 3/2010 | Voit et al. | ................... | 106/287.1 |
| 2010/0209593 | A1 | | 8/2010 | Banerjee et al. | | |
| 2011/0113984 | A1 | * | 5/2011 | Fuller et al. | .................. | 106/31.6 |

FOREIGN PATENT DOCUMENTS

| CN | 1527100 A | 9/2004 |
| CN | 1741246 A | 3/2006 |
| WO | WO-99/42892 A1 | 8/1999 |
| WO | WO-00/22466 A1 | 4/2000 |

OTHER PUBLICATIONS

Sajeev John et al., Photonic Band Gap Materials; A Semiconductor for Light; Department of Physics, University of Toronto, p. 1-23.
U.S. Appl. No. 12/389,221.

* cited by examiner

*Primary Examiner* — Melvin C Mayes
*Assistant Examiner* — Veronica F Faison
(74) *Attorney, Agent, or Firm* — Gifford, Krass, Sprinkle, Anderson & Citkowski, P.C.

(57) ABSTRACT

A paint composition is disclosed, the paint having a binder and an omnidirectional structural color pigment dispersed throughout the binder. The omnidirectional structural color pigment can be made from a plurality of flakes that have a multilayer structure, the pigment and the paint having a reflection band of less than 200 nanometers when viewed from angles between 0 to 45 degrees.

14 Claims, 14 Drawing Sheets

OMNIDIRECTIONAL STRUCTURAL COLOR PAINT

CROSS-REFERENCE TO RELATED APPLICATIONS

This application claims priority to and is a continuation-in-part of U.S. patent application Ser. No. 12/388,395 filed on Feb. 18, 2009, titled "Narrow Band Omnidirectional Reflectors and Their Use as Structural Colors" which in turn claims priority to and is a continuation-in-part of U.S. patent application Ser. No. 11/837,529 filed on Aug. 12, 2007, now U.S. Pat. No. 7,903,339 and having the same title, both applications having the same assignee and both incorporated herein in their entirety by reference.

FIELD OF THE INVENTION

This invention relates to a paint composition, and in particular, to a paint composition that provides an omnidirectional structural color appearance.

BACKGROUND OF THE INVENTION

Paint can be defined as a liquid, liquefiable, or mastic composition which after application to a substrate as a thin layer is converted to an opaque solid film. A wide variety of paints exist for the automotive industry, the housing industry, the advertising industry, the art industry, etc., with the three most common types of paint classified as lacquers, enamels, and water base. Lacquers typically dry quickly because of solvent evaporation whereas enamels dry through a chemical change or reaction of the material. Within enamel paints, two-stage paints can consist of two distinct layers made from a base coat and a clear coat. The base coat/clear coat enamel paints are typically used to repaint cars and trucks with the base coat being a layer of color applied over a primer-sealer and the clear coat sprayed over the base coat. Water base paints, as implied, use water as the carrier of the paint pigment and dry through evaporation of the water.

The main constituents of paint are pigments, binders or vehicles, solvents, and additional additives. Pigments provide the color to the paint whereas the binder is the actual film-forming component. Solvents are typically used to adjust the curing and/or drying properties and viscosity of the paint which can allow the paint to be sprayed onto a desired substrate. Finally, additives that modify surface tension, improve flow properties, improve surface finish, and the like can be included.

A pigment appears as a particular color because it selectively reflects and absorbs certain wavelengths of light. When white light, i.e. light having a roughly equal mixture of the entire visible spectrum of wavelengths, encounters a pigment, some wavelengths are absorbed by the chemical bonds and substituence of the pigment and other wavelengths are reflected. The reflected wavelengths determine the color of the pigment. This type of coloring mechanism is based on light absorption and the molecular structure generally reflects a broad range of wavelength with a moderate reflectivity (50-60%). In contrast, nature provides magnificent colors and metal-type reflectors in insects, butterflies, birds and fish. Such colors found in nature are not based on pigments, but on the interference of light reflected from either a nanoscopic multilayer structure of alternative high and low refractive index materials or a regular array of nano-sized particles. These types of nanostructure assemblies can reflect up to 100% of the incident light. Such types of nanostructure assemblies, for example multilayer structures, have not been exploited for providing narrow reflection bands of electromagnetic radiation and in particular for providing omnidirectional structural color pigments for paint. Therefore, there is a need for a paint that provides a narrow reflection band, the reflection band being constant when the paint is viewed from various viewing angles.

SUMMARY OF THE INVENTION

A paint composition is disclosed, the composition including a binder and an omnidirectional structural color (OSC) pigment dispersed throughout the binder. The OSC pigment is made from a plurality of flakes that have a multilayer structure and provide or afford a paint that has a reflection band of less than 200 nanometers when viewed from angles between 0 to 45 degrees. The binder can be any binder composition known to those skilled in the art, illustratively including a natural resin, a synthetic resin, a dry oil, or water. For example, synthetic resins such as acrylics, vinyl-acrylics, vinyl acetate/ethylene, polyurethanes, polyesters, melamine resins, epoxies, and the like can be used as the binder.

The OSC pigments can be in the form of a flake that has an average thickness range of between 0.5 to 5 microns and an average diameter range of between 5 and 50 microns. In addition, flakes of the OSC pigment can have alternating first and second layers, the first layer being a first material with a first predefined thickness and a refractive index between 2 and 4, and the second layer being a second material with a second predefined thickness and a refractive index between 1 and 3. In addition, the first layer and the second layer can have a refractive index contrast between 0.2 and 1.0.

The first layer of the first material can have a refractive index between 2 and 4 while the second layer of the second material can have a refractive index between 1 and 3. In some instances, the first material has a refractive index between 2 and 2.5 while the second material has a refractive index between 1.8 and 2.2. The multilayer structure can have a reflective band of less than 200 nanometers when viewed from angles between 0 and 60 degrees while in some instances the reflective band is less than 200 nanometers when viewed from angles between 0 and 80 degrees. In still other instances, the reflection band of the multilayer structure can be less than 100 nanometers when viewed from 0 to 45 degrees, 0 to 60 degrees, or 0 to 80 degrees and the multilayer structure may or may not have a quantity defined as a range to mid-range ratio of less than 2%.

The paint can further include a solvent and may or may not be a paint that can be applied to a surface by spraying. The solvent can be any solvent composition known to those skilled in the art, illustratively including organic solvents or water. For example, organic solvents such as aliphatics, aromatics, alcohols, ketones, white spirit, petroleum distillates, esters, glycol ethers, and the like can be used. Additives can be included within the paint composition, for example surface tension modifiers, flow modifiers, surface finish modifiers, wet edge modifiers, pigment stability modifiers, antifreeze modifiers, foam control modifiers, catalysts, thickeners, stabilizers, emulsifiers, texture modifiers, adhesion modifiers, flatteners, biocides, and the like. In some instances, a non-structural color pigment can be included and dispersed throughout the binder along with the OSC pigment. The OSC pigment can make up between 1 and 20 percent of the overall composition, however this is not required. The paint can be a base coat of a two-stage paint or in the alternative the paint can be a base coat of a self-stratifying paint.

A process for producing a component having an omnidirectional structural color appearance is also disclosed, the process including providing a component to be painted and providing a paint having a reflection band of less than 200 nanometers when viewed from an angle between 0 and 45 degrees. Thereafter, an OSC paint is applied to the component and allowed to dry and/or cure, the painted component having an omnidirectional structural color appearance with a reflection band of less than 200 nanometers when viewed from an angle of between 0 and 45 degrees reflected from the surface of the component. In some instances, the component is an automotive component.

DETAILED DESCRIPTION OF THE PREFERRED EMBODIMENTS

Figure 1:
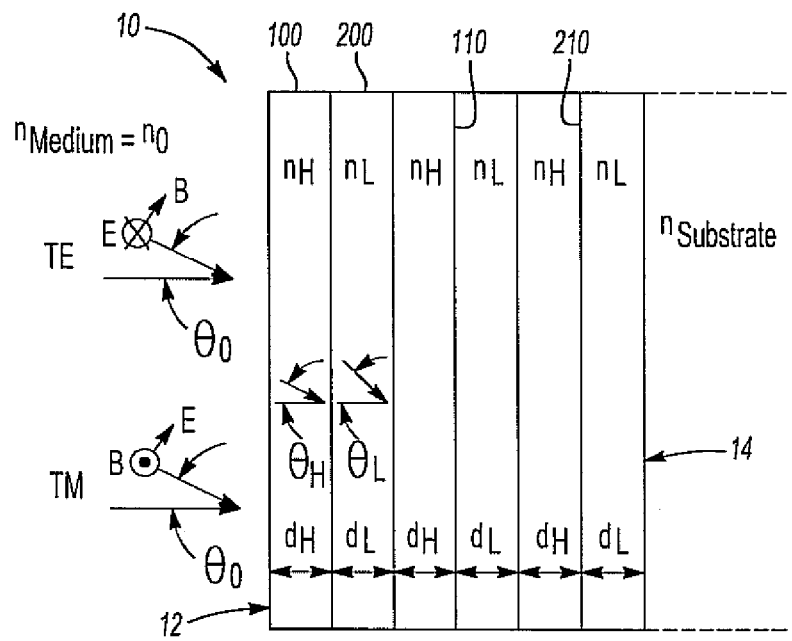
FIG. 1 is a schematic diagram of a multilayer structure of the present invention.

The present invention discloses a paint composition that includes a binder and an omnidirectional structural color (OSC) pigment dispersed throughout the binder. The OSC pigment is made from a plurality of flakes that have a multilayer structure and the paint has a reflection band of less than 200 nanometers when viewed from angles between 0 to 45 degrees. The paint can be applied to a component, structure, and the like and as such has utility as a coating.

The OSC pigments can be in the form of a flake that has an average thickness range of between 0.5 to 5 microns and an average diameter range of between 5 and 50 microns. In addition, flakes of the OSC pigment can have alternating first and second layers, the first layer being a first material with a first predefined thickness and a refractive index between 2 and 4, and the second layer being a second material with a second predefined thickness and a refractive index between 1 and 3. In addition, the first layer and the second layer can have a refractive index contrast between 0.2 and 1.0.

The first layer of the first material can have a refractive index between 2 and 4 while the second layer of the second material can have a refractive index between 1 and 3. In some instances, the first material has a refractive index between 2 and 2.5 while the second material has a refractive index between 1.8 and 2.2. The multilayer structure can have a reflective band of less than 200 nanometers when viewed from angles between 0 and 60 degrees while in some instances the reflective band is less than 200 nanometers when viewed from angles between 0 and 80 degrees. In still other instances, the reflection band of the multilayer structure can be less than 100 nanometers when viewed from 0 to 45 degrees, 0 to 60 degrees, or 0 to 80 degrees and the multilayer structure may or may not have a quantity defined as a range to mid-range ratio of less than 2%.

The paint can further include a solvent and may or may not be a paint that can be applied to a surface by spraying. The solvent can be any solvent composition known to those skilled in the art, illustratively including organic solvents or water. For example, organic solvents such as aliphatics, aromatics, alcohols, ketones, white spirit, petroleum distillates, esters, glycol ethers, and the like can be used. Additives can be included within the paint composition, for example surface tension modifiers, flow modifiers, surface finish modifiers, wet edge modifiers, pigment stability modifiers, antifreeze modifiers, foam control modifiers, catalysts, thickeners, stabilizers, emulsifiers, texture modifiers, adhesion modifiers, flatteners, biocides, and the like. In some instances, a non-structural color pigment can be included and dispersed throughout the binder along with the OSC pigment. The OSC pigment can make up between 1 and 20 percent of the overall composition, however this is not required. The paint can be a base coat of a two-stage paint or in the alternative the paint can be a base coat of a self-stratifying paint.

A process for producing a component having an omnidirectional structural color appearance is also disclosed, the process including providing a component to be painted and providing a paint having a reflection band of less than 200 nanometers when viewed from an angle between 0 and 45 degrees. Thereafter, an OSC paint is applied to the component and allowed to dry and/or cure, the painted component having an omnidirectional structural color appearance with a reflection band of less than 200 nanometers when viewed from an angle of between 0 and 45 degrees reflected from the surface of the component. In some instances, the component is an automotive component.

In order to better teach and disclose the present invention, discussion of the OSC pigments is provided below, followed by one or more examples of the inventive paint disclosed herein.

Referring now to FIG. 1, there is shown a multilayer structure 10 having alternating layers of a first material 100 with a high refractive index ($n_H$) and a thickness ($d_H$), and a second material 200 with a low refractive index ($n_L$) and a thickness ($d_L$). The first material 100 includes an outer surface 110 that can extend across an outer surface 210 of the second material 200. In some instances, the multilayer structure 10 has a total number of layers greater than three. In other instances, the multilayer structure 10 has a total number of layers greater than seven.

An electromagnetic wave consisting of perpendicular electric (E) and magnetic (M) vector components is shown incident to the multilayer structure at an incident angle $\theta_0$. The electromagnetic wave can be distinguished into two independent electromagnetic modes: a transverse electric (TE) mode and a transverse magnetic (TM) mode. The refractive index of the medium beyond the multilayer structure 10 at a first end 12 is $n_0$. For example, when the medium is air, $n_0=1$. The refractive of an optional substrate at a second end 14 is $n_{substrate}$. The optional substrate can be any material compatible with the multilayer structure 10 and can assist in the manufacture, storage, shipping and/or handling of the structure. If an optional substrate is present, it may or may not be removed after the manufacture of the multilayer structure 10.

When electromagnetic radiation impacts a material surface, waves of the radiation can be reflected from or transmitted through the material. Furthermore, when electromagnetic radiation impacts the first end 12 of the multilayer structure 10 at the angle $\theta_0$, the reflected angles the electromagnetic waves make with the surface of the high and low refractive index layers are $\theta_H$ and $\theta_L$, respectively. Usina Snell's law:

$$n_0 \sin\theta_0 = n_L \sin\theta_L = n_H \sin\theta_H \quad (1)$$

the angles $\theta_H$ and $\theta_L$ can be determined if the refractive indices $n_H$ and $n_L$ are known.

Regarding omnidirectional reflectivity, a necessary but not sufficient condition for the TE mode and the TM mode of electromagnetic radiation requires the maximum angle of refraction ($\theta_{H,MAX}$) inside the first layer to be less than the Brewster angle ($\theta_B$) of the interface between the first layer and the second layer. If this condition is not satisfied, the TM mode of the electromagnetic waves will not be reflected at the second and all subsequent interfaces and thus will transmit through the structure. Using this consideration:

$$\sin\theta_{H,Max} = \frac{n_0}{n_H} \quad (2)$$

and $$\tan\theta_B = \frac{n_L}{n_H} \quad (3)$$

Thereby requiring:

$$n_0 < \frac{n_H n_L}{\sqrt{n_H^2 + n_L^2}} \quad (4)$$

In addition to the necessary condition represented by Equation 4, if electromagnetic radiation of wavelength $\lambda$ falls on a multilayer structure with an angle $\theta_0$, and the individual bi-layers of the multilayer structure have thicknesses $d_H$ and $d_L$ with respective refractive indices $n_H$ and $n_L$, the characteristic translation matrix ($F_T$) can be expressed as:

$$F_T = \frac{1}{1+\rho_T}\begin{vmatrix} e^{i\delta_L} & \rho_T e^{-i\delta_L} \\ \rho_T e^{i\delta_L} & e^{-i\delta_L} \end{vmatrix} \times \frac{1}{1-\rho_T}\begin{vmatrix} e^{i\delta_H} & \rho_T e^{-i\delta_H} \\ \rho_T e^{i\delta_H} & e^{-i\delta_H} \end{vmatrix} \quad (5)$$

which can also be expressed as:

$$F_T = \frac{1}{1-\rho_T^2}\begin{vmatrix} e^{i(\delta_L+\delta_H)} - \rho_T^2 e^{-i(\delta_H-\delta_L)} & -2i\rho_T e^{-i\delta_H}\sin\delta_L \\ 2i\rho_T e^{i\delta_H}\sin\delta_L & e^{-i(\delta_L+\delta_H)} - \rho_T^2 e^{-i(\delta_H-\delta_L)} \end{vmatrix} \quad (6)$$

and where:

$$\delta_H = \frac{2\pi}{\lambda} n_H d_H \cos\theta_H \quad (7)$$

$$\delta_L = \frac{2\pi}{\lambda} n_L d_L \cos\theta_L \quad (8)$$

$$\cos\theta_H = \sqrt{1 - \frac{n_0^2 \sin^2\theta_0}{n_H^2}} \quad (9)$$

and $$\cos\theta_L = \sqrt{1 - \frac{n_0^2 \sin^2\theta_0}{n_L^2}} \quad (10)$$

In addition $$\rho_T = \frac{n_{HT} - n_{LT}}{n_{HT} + n_{LT}} \quad (11)$$

where

-continued $$n_{HT} = \begin{cases} \dfrac{n_H}{\cos\theta_H} \\ n_H \cos\theta_H \end{cases} \text{(for TM and TE polarization respectively)} \quad (12)$$

and $$n_{LT} = \begin{cases} \dfrac{n_L}{\cos\theta_L} \\ n_L \cos\theta_L \end{cases} \text{(for TM and TE polarization respectively)} \quad (13)$$

Solving $\rho_T$ explicitly for TE and TM:

$$\rho_{TM} = \frac{n_H \cos\theta_L - n_L \cos\theta_H}{n_H \cos\theta_L + n_L \cos\theta_H} \quad (14)$$

and $$\rho_{TE} = \frac{n_H \cos\theta_H - n_L \cos\theta_L}{n_H \cos\theta_H + n_L \cos\theta_L} \quad (15)$$

A viewing angle dependant band structure can be obtained from a boundary condition for the edge, also known as the bandedge, of the total reflection zone. For the purposes of the present invention, bandedge is defined as the equation for the line that separates the total reflection zone from the transmission zone for the given band structure.

A boundary condition that determines the bandedge frequencies of the high reflectance band can be given by:

$$\text{Trace}|F_T| = -1 \quad (16)$$

Thus, from equation 3:

$$\frac{\cos(\delta_H + \delta_L) - \rho_T^2 \cos(\delta_H - \delta_L)}{1 - \rho_T^2} = -1 \quad (17)$$

or expressed differently:

$$\cos^2\left(\frac{\delta_H + \delta_L}{2}\right) = \rho_T^2 \cos^2\left(\frac{\delta_H - \delta_L}{2}\right) \quad (18)$$

Combining equations 15 and 7, the following bandedge equation is obtained:

$$\cos\left(\frac{\pi L_+}{\lambda}\right) = \pm|\rho_T|\cos\left(\frac{\pi L_-}{\lambda}\right) \quad (19)$$

Where:

$$L_+ = n_H d_H \cos\theta_H + n_L d_L \cos\theta_L \quad (20)$$

and:

$$L_- = n_H d_H \cos\theta_H - n_L d_L \cos\theta_L \quad (21)$$

The + sign in the bandedge equation shown above represents the bandedge for the long wavelength ($\lambda_{long}$) and the − sign represents the bandedge for the short wavelength ($\lambda_{short}$). Recompiling equations 20 and 21:

$$\cos\left(\frac{\pi L_+}{\lambda_{long}}\right) = +|\rho_{TE}|\cos\left(\frac{\pi L_-}{\lambda_{long}}\right) \quad (22)$$

and $$\cos\left(\frac{\pi L_+}{\lambda_{Short}}\right) = -|\rho_{TE}|\cos\left(\frac{\pi L_-}{\lambda_{Short}}\right)$$

for the TE mode, and:

$$\cos\left(\frac{\pi L_+}{\lambda_{long}}\right) = +|\rho_{TM}|\cos\left(\frac{\pi L_-}{\lambda_{long}}\right) \quad (23)$$

and $$\cos\left(\frac{\pi L_+}{\lambda_{Short}}\right) = -|\rho_{TM}|\cos\left(\frac{\pi L_-}{\lambda_{Short}}\right)$$

An approximate solution of the bandedge can be determined by the following expression:

$$L_- = n_H d_H \cos\theta_H - n_L d_L \cos\theta_L \sim 0 \quad (24)$$

This approximate solution is reasonable when considering a quarter wave design (described in greater detail below) and optical thicknesses of the alternating layers chosen to be equal to each other. In addition, relatively small differences in optical thicknesses of the alternating layers provide a cosine close to unity. Thus, equations 23 and 24 yield approximate bandedge equations:

$$\lambda_{long}(\theta_0) = \frac{\pi L_+(\theta_0)}{\cos^{-1}|\rho_{TE}(\theta_0)|} \quad (25)$$

and $$\lambda_{Short}(\theta_0) = \frac{\pi L_+(\theta_0)}{\cos^{-1}(-|\rho_{TE}(\theta_0)|)}$$

for the TE mode and:

$$\lambda_{long}(\theta_0) = \frac{\pi L_+(\theta_0)}{\cos^{-1}|\rho_{TM}(\theta_0)|} \quad (26)$$

and $$\lambda_{Short}(\theta_0) = \frac{\pi L_+(\theta_0)}{\cos^{-1}(-|\rho_{TM}(\theta_0)|)}$$

for the TM mode.

Values for $L_+$ and $\rho_{TM}$ as a function of incident angle can be obtained from equations 7, 8, 14, 15, 20 and 21, thereby allowing calculations for $\lambda_{long}$ and $\lambda_{short}$ in the TE and TM modes as a function of incident angle.

Figure 2:
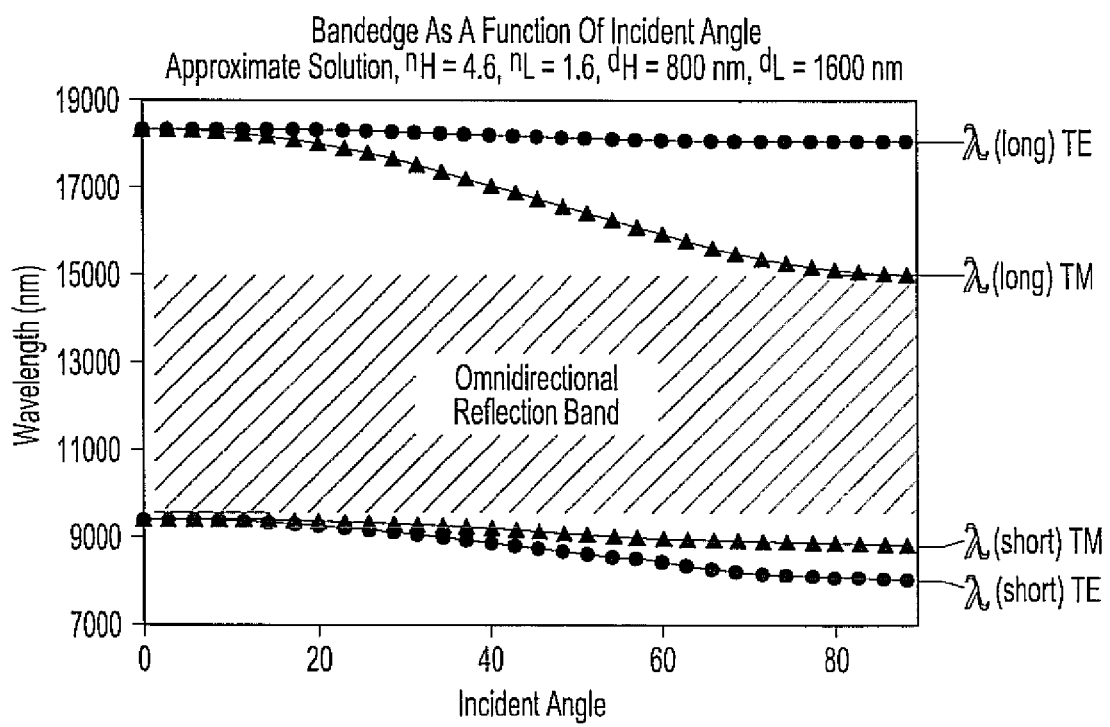
FIG. 2 is a graphical representation of bandedge as a function of incident angle.

Turning to FIG. 2, the TE and TM bandedges as a function of incident angle on a multilayer system with a first material having a high refractive index equal to 4.6 and a thickness of 800 nanometers and a second layer material with a refractive index of 1.6 and a thickness of 1600 nanometers are shown. The omnidirectional band is defined by the wavelength range where electromagnetic radiation coming from any angle will be completely reflected as shown by the highlighted box. For the example shown in FIG. 2, the omnidirectional band is in the infrared region and is approximately between the wavelengths of 9.34 microns and 15 microns. Mathematically, the omnidirectional band shown in FIG. 2 can be written as:

$$\Delta\lambda_{omni} = \lambda_{long}^{TM}(90°) - \lambda_{Short}^{TE}(0°) \quad (27)$$

Figure 3:
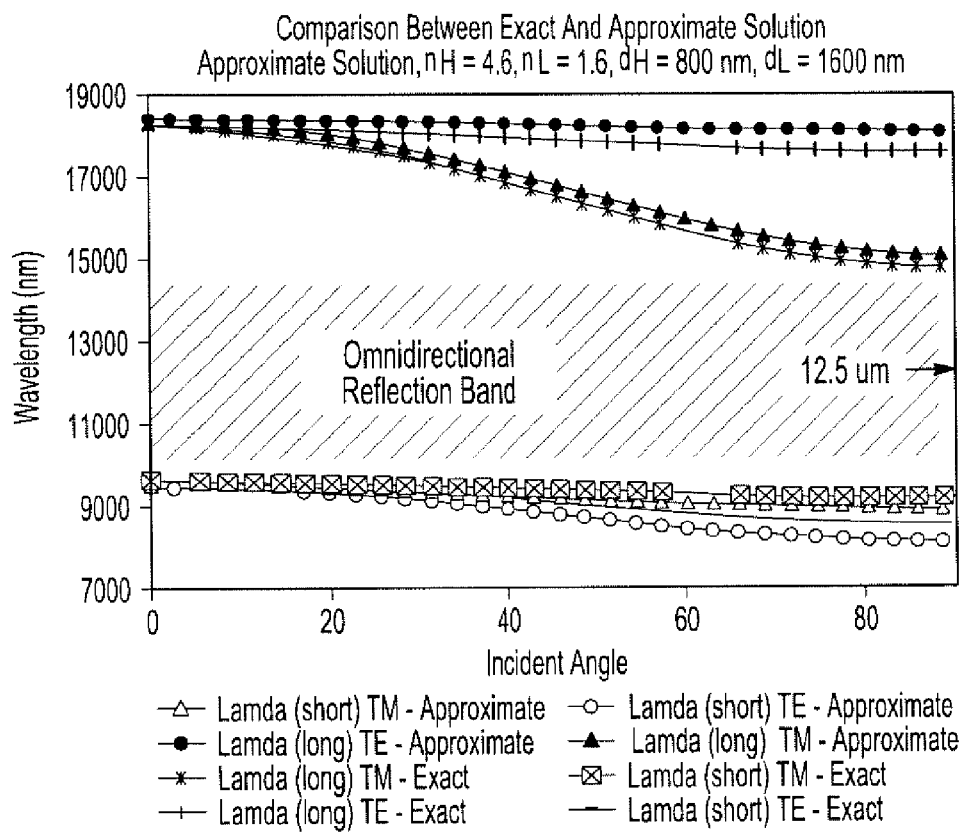
FIG. 3 is a graphical representation comparing an exact solution and an approximate solution for bandedge as a function of incident angle.

An exact solution to the bandedge equations of equation 23 and equation 24 can be represented as:

$$\lambda_{long}(\theta_0) = \frac{\lambda L_+(\theta_0)}{\text{Cos}^{-1}\left|\rho_{TE}(\theta_0)\text{Cos}\left(\frac{\pi L_-}{\lambda_{Long}}\right)\right|} \quad (28)$$

and $$\lambda_{Short}(\theta_0) = \frac{\lambda L_+(\theta_0)}{\text{Cos}^{-1}\left|\rho_{TE}(\theta_0)\text{Cos}\left(\frac{\pi L_-}{\lambda_{Short}}\right)\right|}$$

for the TE mode, and:

$$\lambda_{long}(\theta_0) = \frac{\pi L_+(\theta_0)}{\text{Cos}^{-1}\left|\rho_{TM}(\theta_0)\text{Cos}\left(\frac{\pi L_-}{\lambda_{Long}}\right)\right|} \quad (29)$$

and $$\lambda_{Short}(\theta_0) = \frac{\pi L_+(\theta_0)}{\text{Cos}^{-1}\left|\rho_{TM}(\theta_0)\text{Cos}\left(\frac{\pi L_-}{\lambda_{Short}}\right)\right|}$$

for the TM mode. Using numerical evaluation, a comparison between the exact and approximate solutions for the multilayer system described above is shown in FIG. 3. FIG. 3 thus demonstrates that an approximation method for the determination of the bandedge equations is reasonable and adequate.

The center wavelength of an OSC pigment ($\lambda_c$), can be determined from the relation:

$$\lambda_c = 2(n_H d_H \text{Cos}\,\theta_H + n_L d_L \text{Cos}\,\theta_L) \quad (30)$$

The center wavelength can be an important parameter since its value indicates the approximate range of electromagnetic wavelength and/or color spectrum to be reflected. For example, the multilayer system described above for normal incidence provides a center wavelength of 12.5 microns, which is consistent with the plots shown in FIGS. 2 and 3.

Figure 4A:
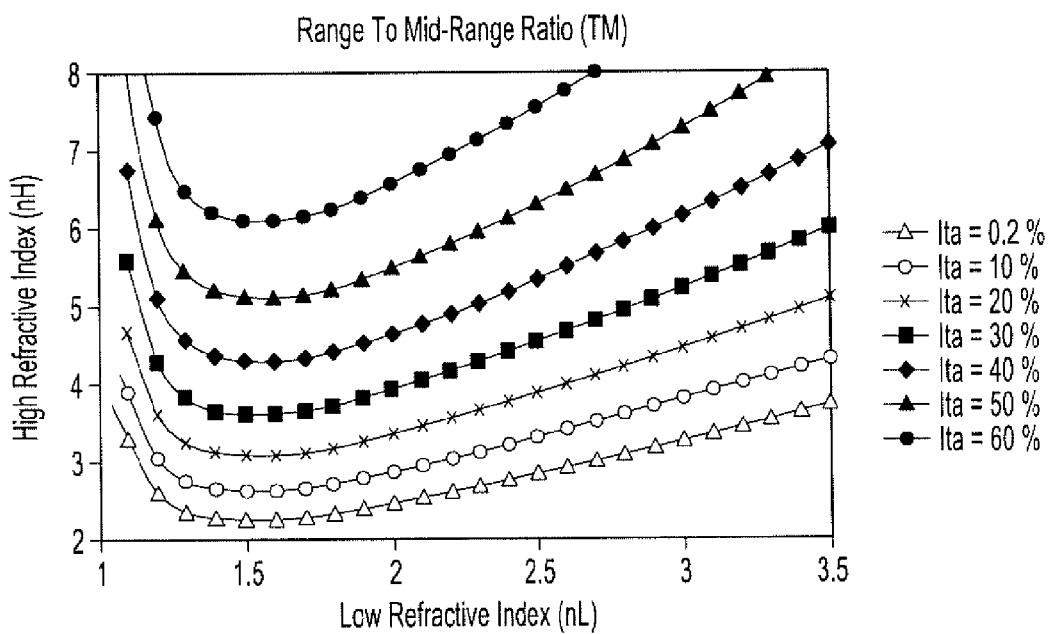
FIG. 4A is a graphical representation of range to mid-range ratios for the transverse magnetic mode of electromagnetic radiation.
Figure 4B:
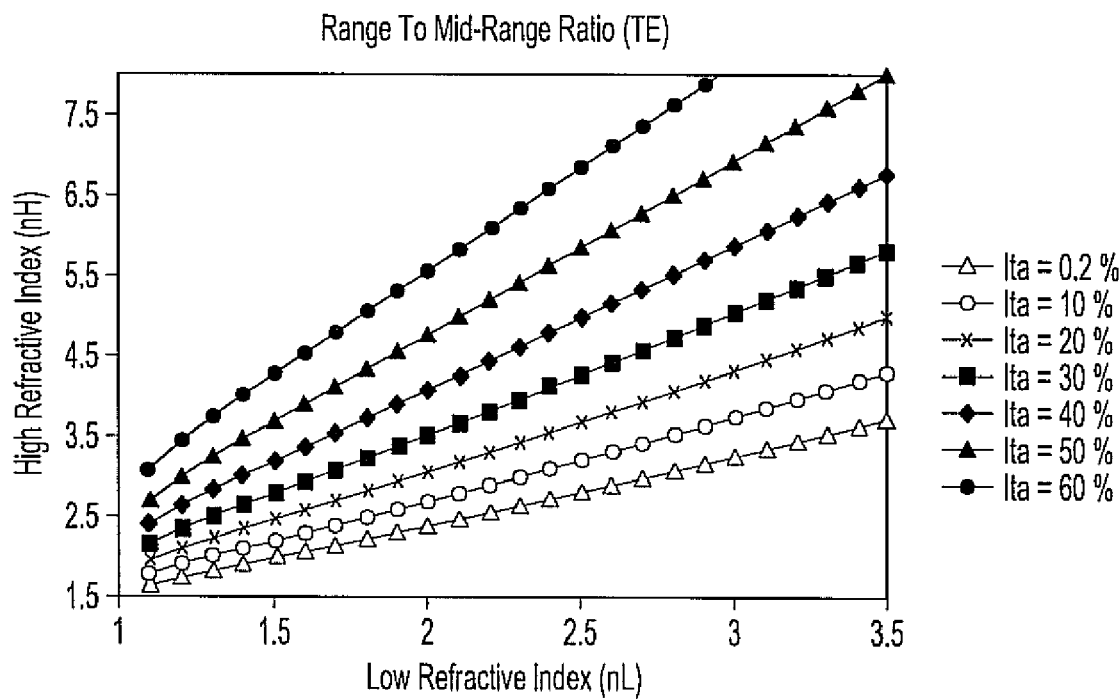
FIG. 4B is a graphical representation of range to mid-range ratios for the transverse electric mode of electromagnetic radiation.

Another important parameter that can provide an indication as to the width of a reflection band is defined as the ratio of range of wavelengths within the omnidirectional reflection band to the mid-range of wavelengths within the omnidirectional reflection band. This "range to mid-range ratio" ($\eta$) is mathematically expressed as:

$$\eta_{TE} = 2\frac{\lambda_{long}^{TE}(\theta_0 = 90°) - \lambda_{Short}^{TE}(\theta_0 = 0°)}{\lambda_{long}^{TE}(\theta_0 = 90°) + \lambda_{Short}^{TE}(\theta_0 = 0°)} \quad (31)$$

for the TE mode, and:

$$\eta_{TM} = 2\frac{\lambda_{long}^{TM}(\theta_0 = 90°) - \lambda_{Short}^{TE}(\theta_0 = 0°)}{\lambda_{long}^{TM}(\theta_0 = 90°) + \lambda_{Short}^{TE}(\theta_0 = 0°)} \quad (32)$$

for the TM mode. It is appreciated that the range to mid-range ratio can be expressed as a percentage and for the purposes of the present invention, the term range to mid-range ratio and range to mid-range ratio percentage are used interchangeably. It is further appreciated that a "range to mid-range ratio" value provided herein having a "%" sign following is a percentage value of the range to mid-range ratio. The range to mid-range ratios for the TM mode and TE mode can be numerically calculated from equations 31 and 32 and plotted as a function of high refractive index and low refractive index, as illustrated in FIGS. 4A and 4B. Furthermore, once the range to mid-range ratio has been determined, corresponding reflectance as a function of wavelength can be plotted.

Figure 5A:
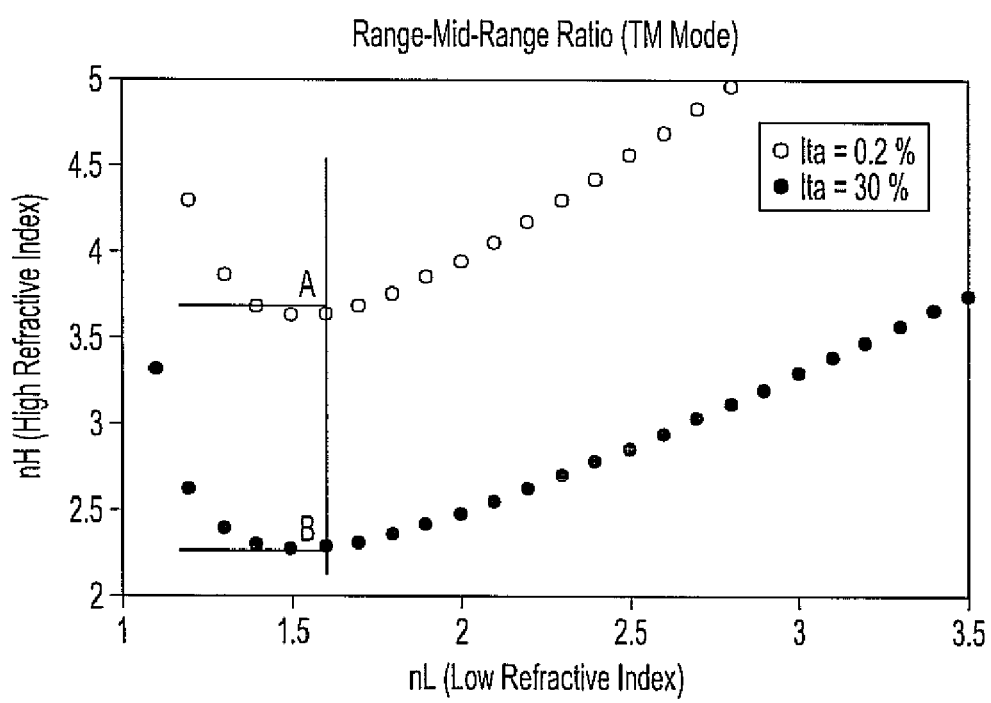
FIG. 5A is a graphical representation of range to mid-range ratios equal to 30% and 0.2%.
Figure 5B:
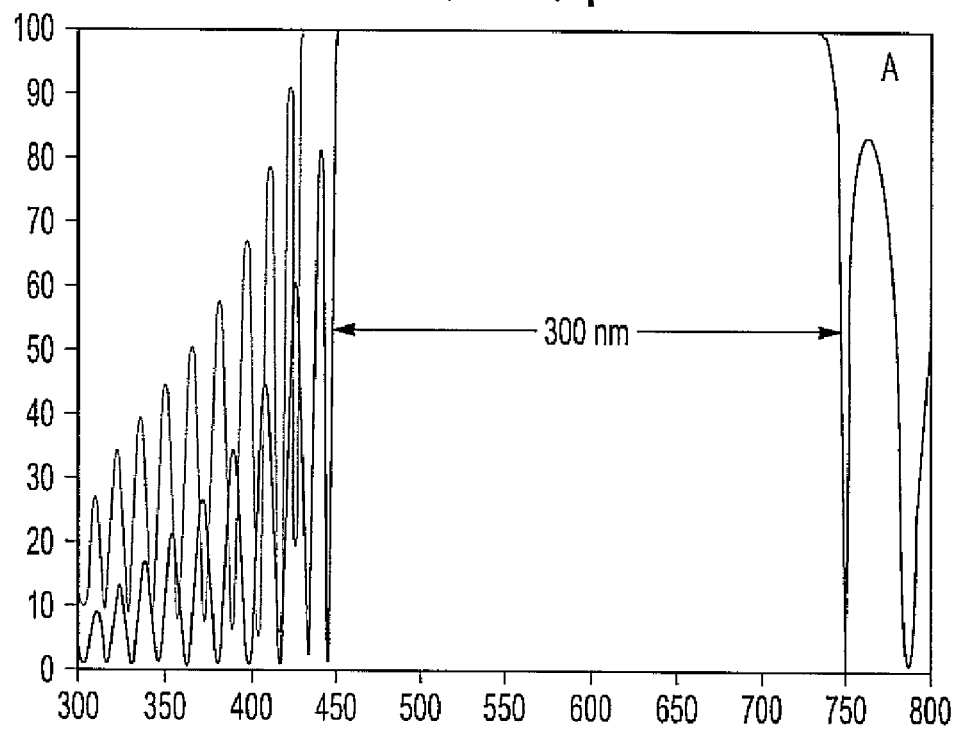
FIG. 5B is a graphical representation of corresponding reflectance spectra for the range to mid-range ratios of 30% and 0.2% shown in FIG. 5A.
Figure 5B:
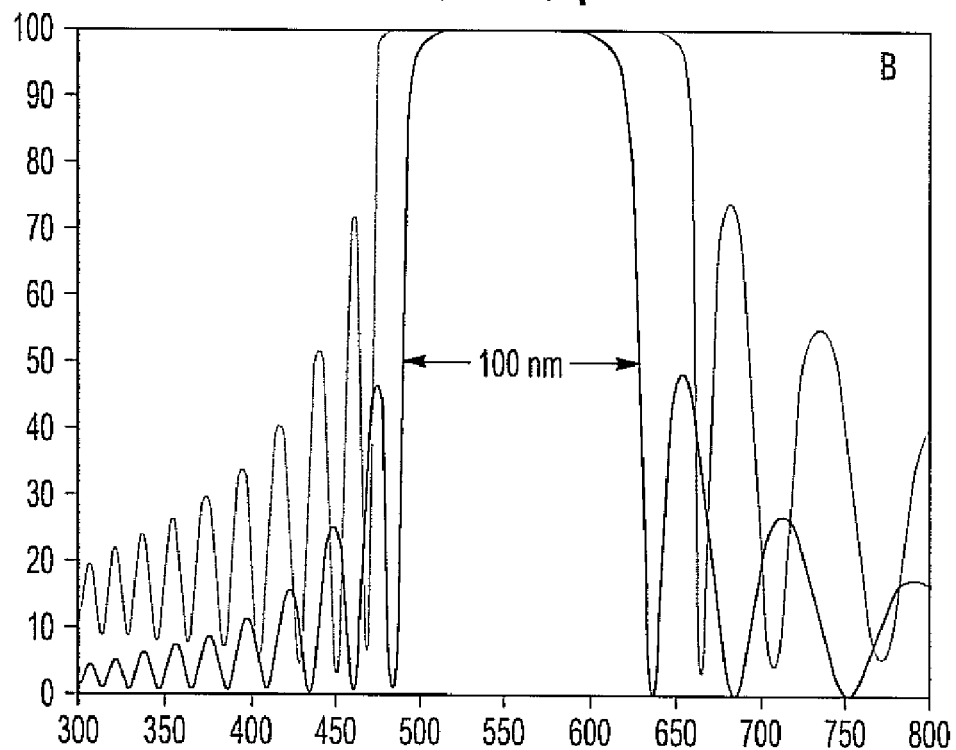

An example of the reflectance as a function of the range to mid-range ratio is demonstrated in FIGS. 5A and 5B. FIG. 5A shows two curves for a TM mode range to mid-range ratio—one for $\eta_{TM}$ equal to 0.2% and one for $\eta_{TM}$ equal to 30%. FIG. 5B shows the corresponding reflectance for range to mid-range ratios labeled "A" and "B" in FIG. 5A with angles of incidence ranging from 0° to 45°. With a range to mid-range ratio of 30% and the angles of incidence ranging from 0° to 45°, the reflection band illustrated in FIG. 5B is approximately 300 nanometers. In contrast, for a range to mid-range ratio of 0.2% and the same angles of incidence, the reflection band is approximately 100 nanometers.

Regarding the center wavelength of the OSC pigment, equation 30 demonstrates that the center wavelength, and therefore the dispersion of the center wavelength, is a function of the incidence angle. In some instances, the OSC pigments of the present invention have a small dispersion of the center wavelength as a function of the incidence angle. The narrower the range of the dispersion of the center wavelength, the purer the observed color since a more narrow band of wavelengths are reflected from the reflector to, for example, a human eye.

Figure 6:
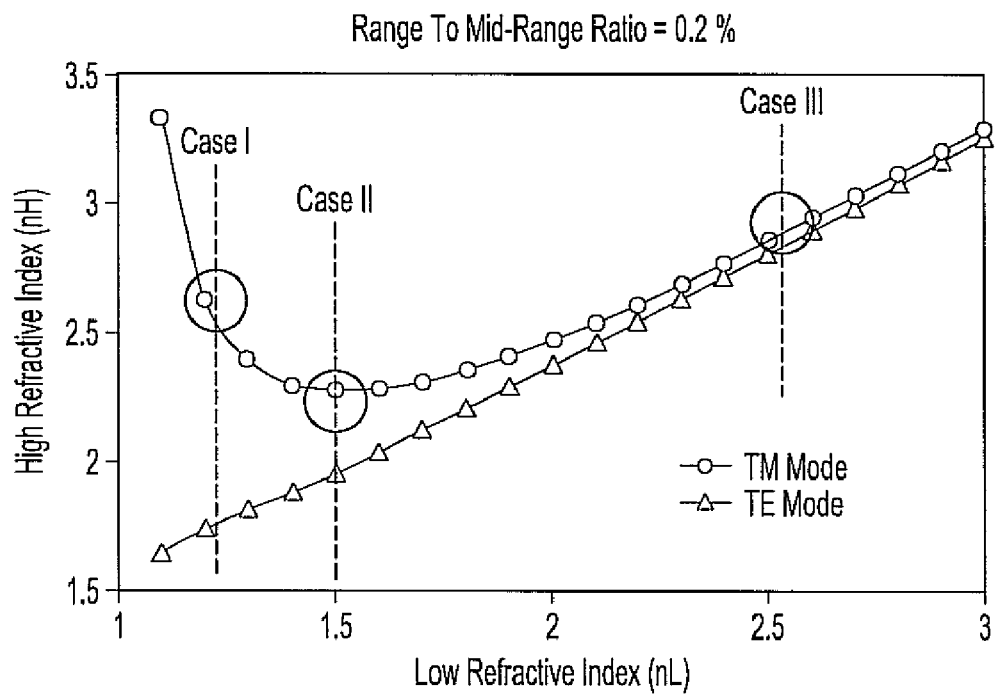
FIG. 6 is a graphical representation showing a comparison of the range to mid-range ratio of 0.2% for the transverse magnetic mode and transverse electric mode of electromagnetic radiation.

A method to control the dispersion of the center wavelength can include comparison of the range to mid-range ratios for the TM mode and the TE mode as a function of high reflection indices and low reflection indices. FIG. 6 illustrates a range to mid-range ratio of 0.2% for the TM mode and the TE mode as a function of high refractive index and low refractive index. As illustrated in FIG. 6, a relatively large difference between the high refractive indices for the TM mode and TE mode is shown by Case I, an intermediate difference by Case II, and a relatively small difference by Case III. Thus for a given range to mid-range ratio, different values for the high refractive index and the low refractive index can be chosen.

Figure 7A:
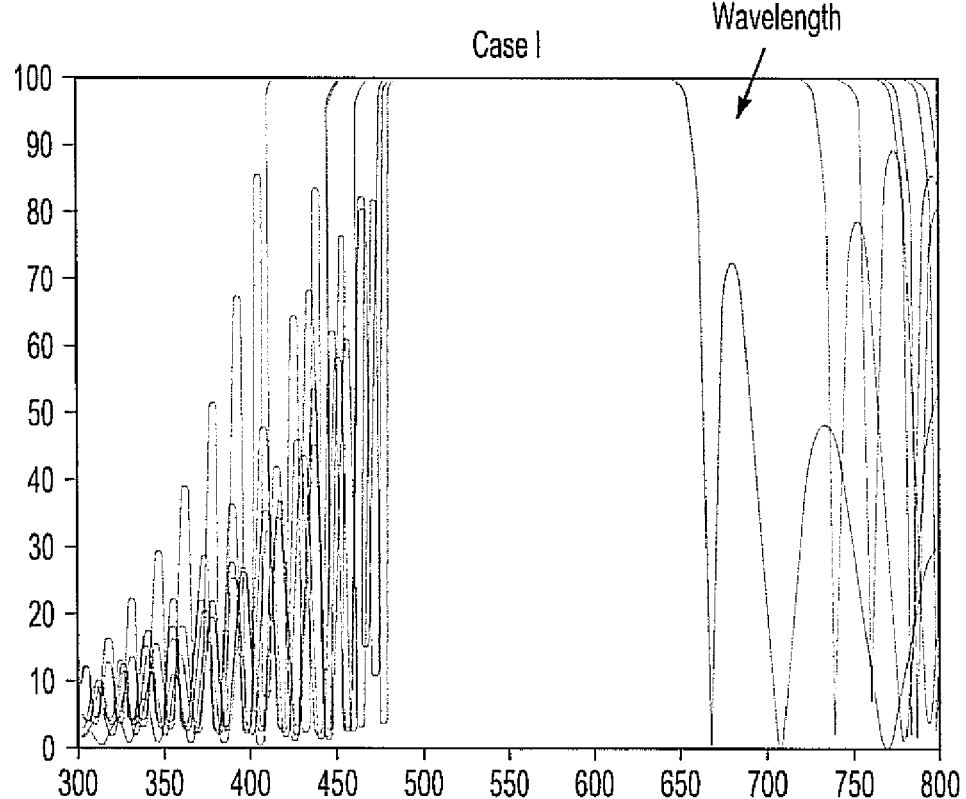
FIG. 7A is a graphical representation of the reflectance as a function of wavelength for Case I shown in FIG. 6.
Figure 7B:
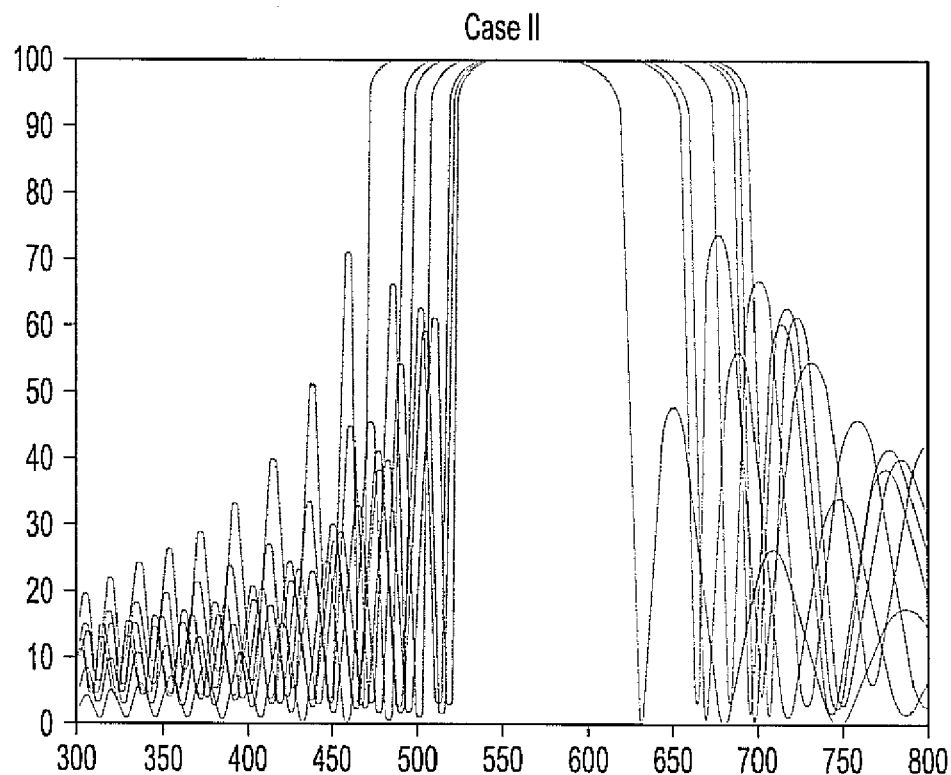
FIG. 7B is a graphical representation of the reflectance as a function of wavelength for Case II shown in FIG. 6.
Figure 7C:
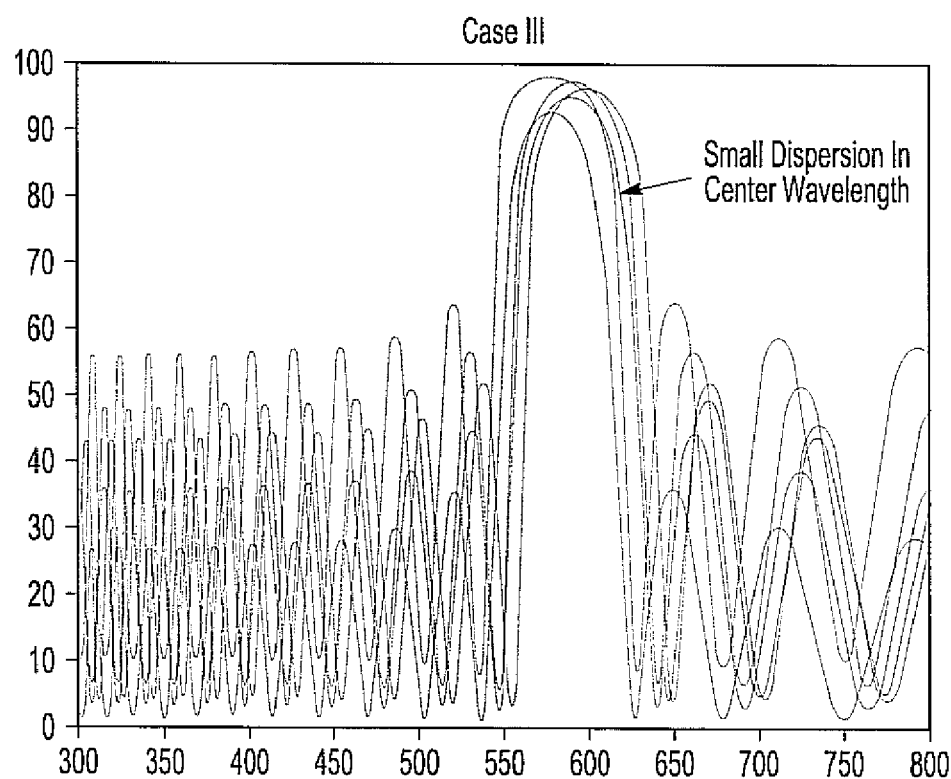
FIG. 7C is a graphical representation of reflectance as a function of wavelength for Case III shown in FIG. 6.
Figure 7D:
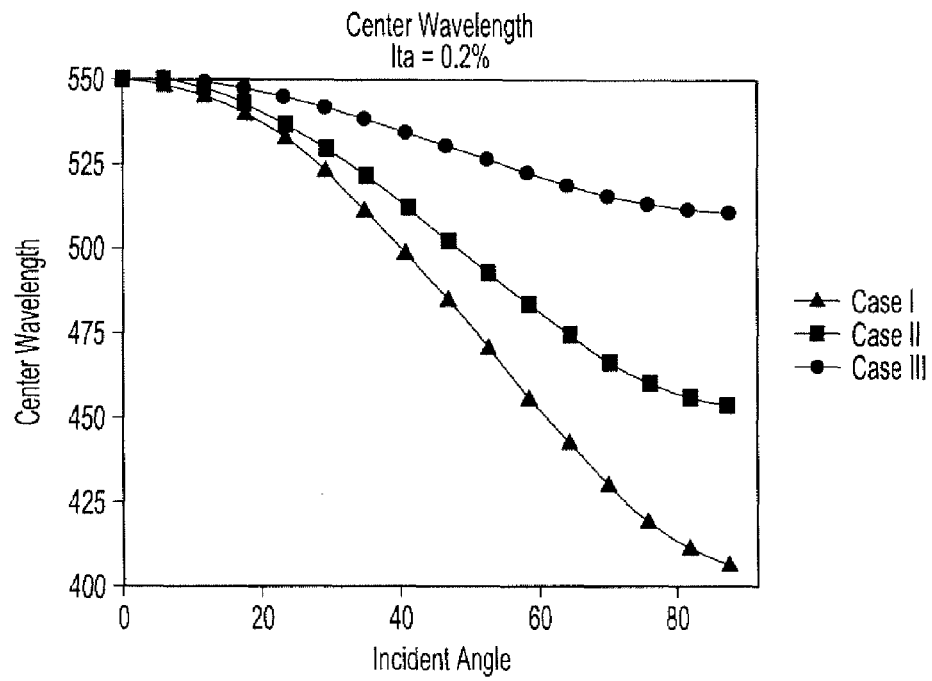
FIG. 7D is a graphical representation of the dispersion of the center wavelength in Case I, II and III.

Turning to FIG. 7A, the reflectance as a function of wavelength for Case I is illustrated wherein the high refractive index equals 2.61, the low refractive index equals 1.2 and the angle of incidence ranges from 0° to 45°. As illustrated by this figure, the center wavelength shifts significantly when electromagnetic radiation incident normal to the multilayer structure is compared to electromagnetic radiation incident 45° to the structure. In contrast, a relatively small difference between the high refractive index and the low refractive index, and equivalent angles of incidence, results in a small dispersion of the center wavelength as shown in FIG. 7C. Thus, for a narrow range of wavelengths to be reflected by a multilayer structure, a relatively small difference between the refractive indices between the first material 100 and the second material 200 is desired. FIG. 7D quantifies the dispersion in center wavelength with varying incident angle for Case I, II and III, and illustrates the reduction in dispersion from approximately 140 nm for Case I to approximately 40 nm for Case III.

In another embodiment of the present invention, a quarter wave technique can be used to determine the refractive indices and thicknesses of alternating layers of material for an OSC pigment. Using this method, the optical thicknesses of the high refractive index material and low refractive index material are set to be equal to each other, and equal to one-fourth of a desired reflective wavelength. Thus, once the refractive indices of the multilayer structure have been selected, the thicknesses of the individual layers are set based on the following equation:

$$\eta_H d_H = \eta_L d_L = \frac{\lambda_o}{4} \quad (33)$$

where $\lambda_0 = \lambda_c$ at $\theta_0 = 0$.

Figure 8:
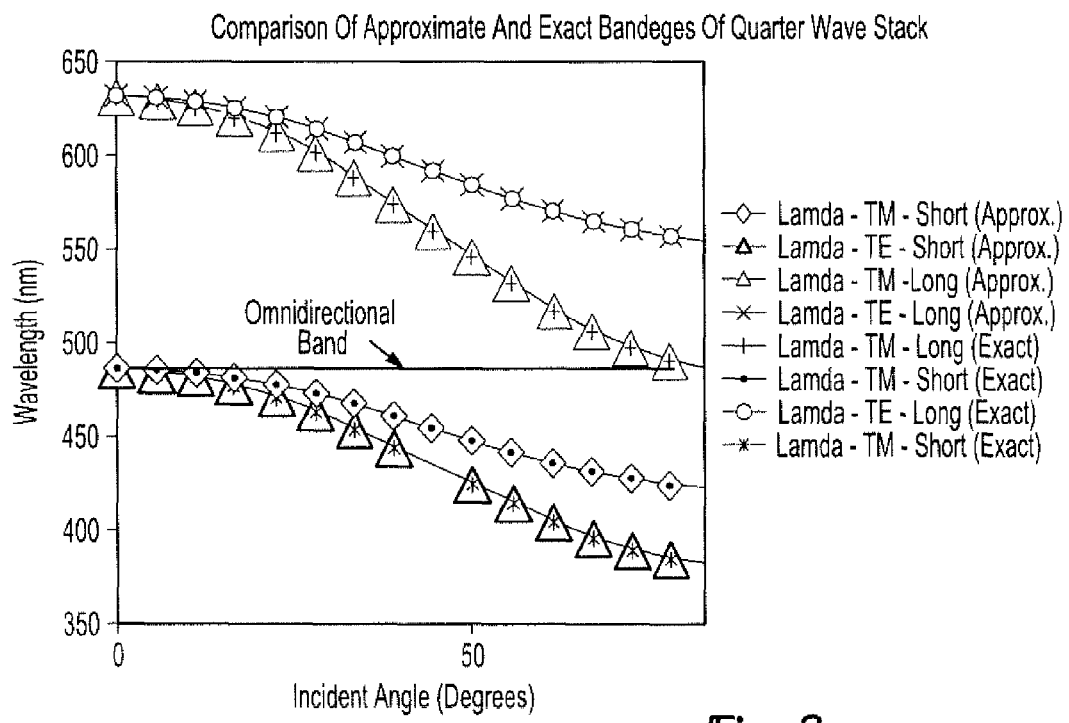
FIG. 8 is a graphical representation of the comparison of approximate and exact solutions for the bandedges of a multilayer structure designed according to the quarter wave technique.

Turning to FIG. 8, a graphical representation of an approximate solution to the bandedges of a quarter wave OSC pigment is shown according to the parameters of Case II mentioned above. This figure also shows the exact solutions whereby similar results are obtained. As illustrated in this figure, a narrow omnidirectional band at 490 nanometers is consistent with the reflectance band shown in FIG. 7B. It is appreciated that to obtain the narrow omnidirectional band that the dispersion of the center wavelength must be minimized. Thus, from equation 30, the dispersion of the center wavelength can be expressed as:

$$\Delta\lambda_c = \lambda_c \big|_{\theta_0=0^0} - \lambda_c \big|_{\theta_0=90^0} = \quad (34)$$

$$2\left( \frac{n_H d_h}{1} + \frac{n_L d_L}{1} - \frac{n_H d_H}{\sqrt{1 - \frac{n_0^2}{n_H^2}}} - \frac{n_L d_L}{\sqrt{1 - \frac{n_0^2}{n_L^2}}} \right)$$

where:

$$\Delta\lambda_c = \frac{\lambda_0}{4} F_c \quad (35)$$

and $F_c$, the center wavelength dispersion factor can be expressed as:

$$F_c = \left( 2 - \frac{1}{\sqrt{1 - \frac{n_0^2}{n_H^2}}} - \frac{1}{\sqrt{1 - \frac{n_0^2}{n_L^2}}} \right) \quad (36)$$

Figure 9A:
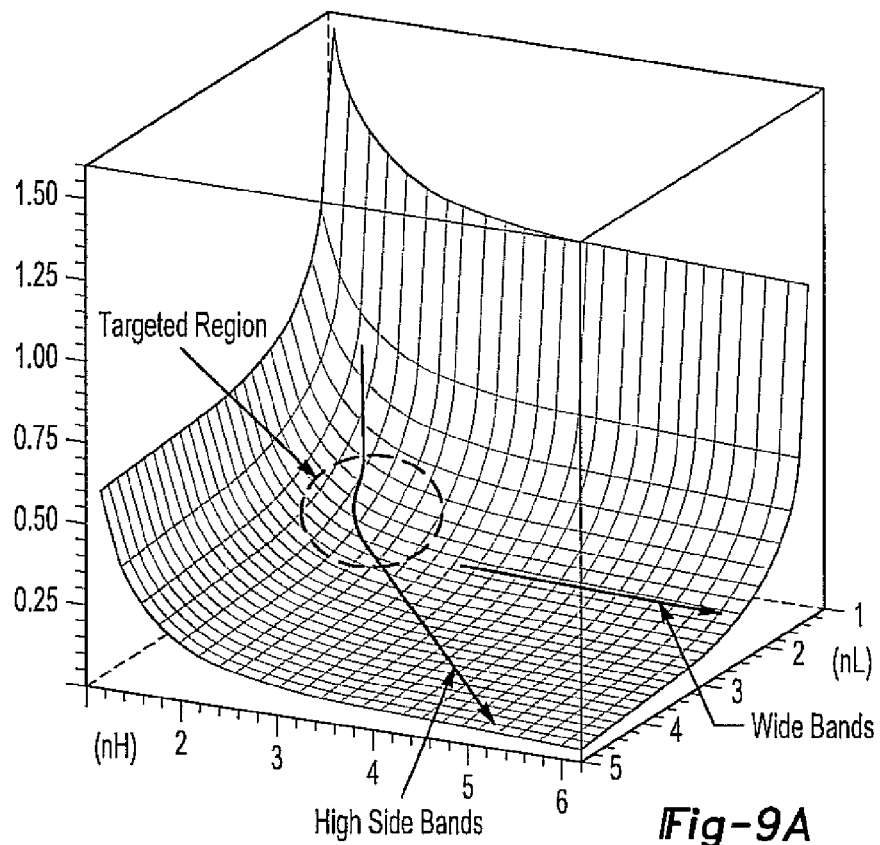
FIG. 9A is a graphical representation of a center wavelength dispersion factor as a function of high refractive indices and low refractive indices.

The center wavelength dispersion factor is shown in FIG. 9A as a function of the high refractive index and the low refractive index. Thus, from equation 36 and FIG. 9A, the dispersion of the center wavelength can be reduced with the proper selection of high and low refractive index material. Also illustrated in FIG. 9A with the "Wide Bands" arrow is the fact that a multilayer structure exhibiting a large difference between the high refractive index and the low refractive index will possess a wide reflection band even though the center wavelength dispersion factor is relatively low. Likewise, when the alternating layers possess a first material with a high refractive index material that approaches the low refractive index of the second material, higher side bands of the reflected electromagnetic radiation occur as illustrated by the "High side bands" arrow. The higher side bands can be reduced using a variety of methods, illustratively including the use of Rugate filters.

Figure 9B:
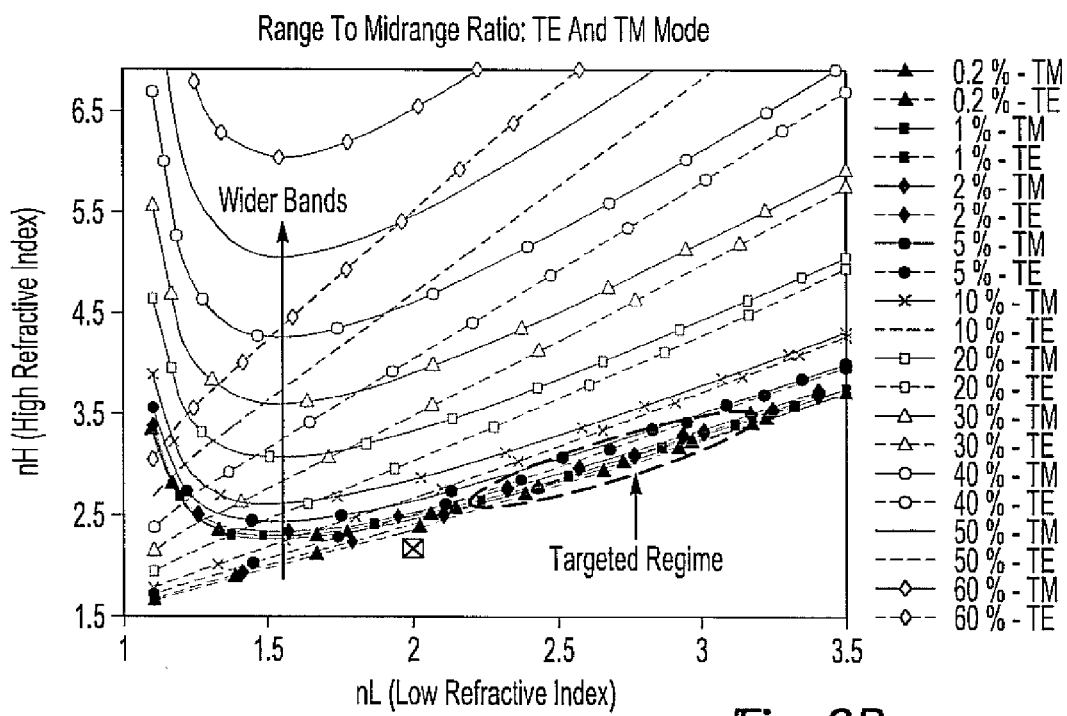
FIG. 9B is a graphical representation of the range to mid-range ratios for transverse electric mode and traverse magnetic mode wherein a desired region of high reflective indices and low reflective indices is highlighted.
Figure 9C:
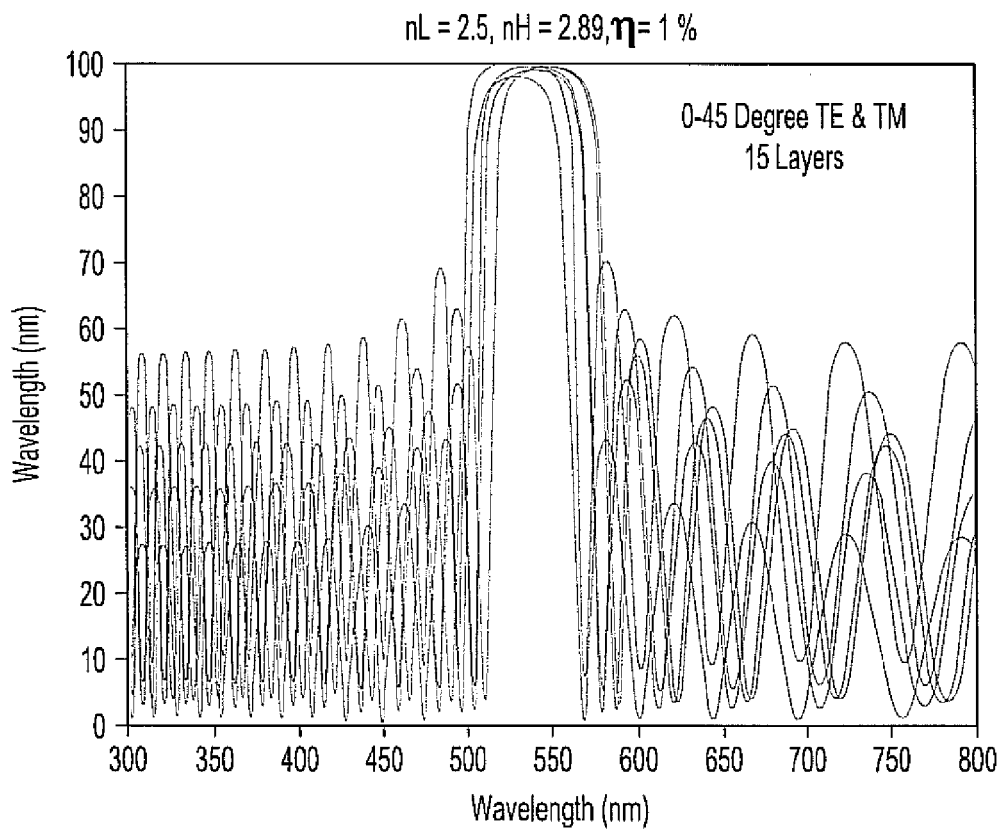
FIG. 9C is a graphical representation of narrow band omnidirectional reflectivity of a case with low refractive index contrast between high and low refractive index material.
Figure 9D:
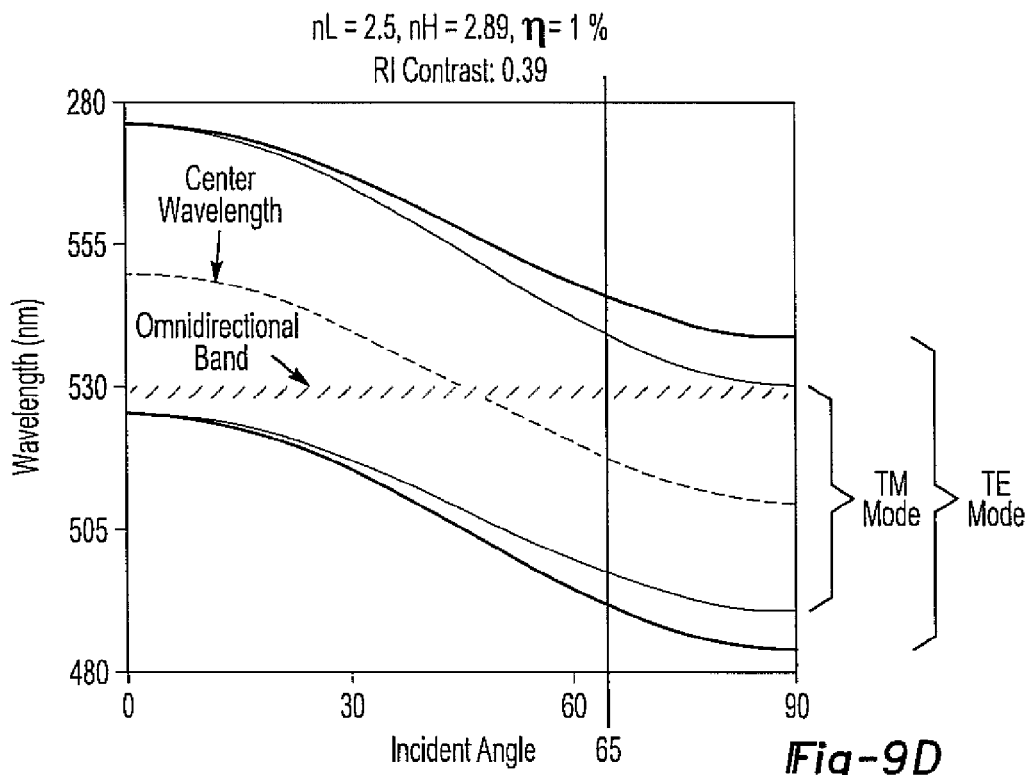
FIG. 9D is a graphical representation of band structure of a narrow band omnidirectional reflective design with low refractive index contrast between high and low refractive index material.

FIG. 9B provides a targeted region for range to mid-range ratios, high refractive indices and low refractive indices. When the difference between range to mid-range ratio of the TE and TM modes is relatively large, a wide or large reflection band of the multilayer structure occurs. In contrast, for relatively small range to mid-range ratios, a relatively narrow reflection band is exhibited with a targeted regime of such values shown in the diagram. In addition, FIGS. 9C and 9D illustrate that when a small refractive index contrast (0.39) is chosen between the high and low refractive index materials, a narrow bandwidth OSC pigment is obtained in the visible region.

Thus, in some instances, OSC pigments have alternating layers of materials wherein one material has a low refractive index range between 1 and 3 and another material has a high refractive index range between 2 and 4. In addition, the difference between the low refractive index material and the high refractive index material, herein defined as the refractive index contrast, ranges between 0.2 and 1.0, and the range to mid-range ratio percentage varies from a value greater than zero to 10%. In other instances, the materials used for the alternating layers of an OSC pigment include a first material with a low refractive index ranging between 2 and 3, a second material with a high refractive index ranging from 2.47 to 3.38. In yet other instances, the difference between the high refractive index material and the low refractive index material can be between 0.35 and 0.5, and/or the range to mid-range ratio percentage can be a value greater than zero and 5%. In some instances the mid-range ratio percentage can also range between a value greater than zero and 2%. Suitable materials for the production of an OSC pigment of the present invention are chosen such that the above-stated criteria are met.

Table 1 shows possible, but not limited to, high and low refractive index materials, respectively, for an OSC pigment exhibiting a narrow reflective band. Thus, by choosing appropriate materials such that the difference between the refractive indices is between 0.2 to 1.0, and the range to mid-range ratio percentage is between a positive value greater than zero and 10%, an OSC pigment which affords for a structural color that remains constant when viewed from various angles is provided. In some instances the structural color provided by the OSC pigment of the present invention remains constant when viewed from angles between 0° to 80°. In other instances, the structural color remains constant when viewed from angles between 0° to 65°. In yet other instances, the structural color remains constant when viewed from angles between 0° to 45°. In addition, some of the materials shown in Table 1 have a refractive index represented by a real part and an imaginary part (i). It is appreciated that the imaginary part can provide and/or represent an absorption part and/or quality of the material.

Again, Table 1 is for illustrative purposes only and in no way limits the scope of the present invention. Any two layers having a difference between the refractive indices between 0.2 to 1.0, and a range to mid-range ratio percentage between a positive value greater than zero and 10% is within the scope of the present invention. In addition, it is within the scope of the present invention that more than two different materials can be used in the multilayer stack and/or that one of the alternating layers can be a defect layer, i.e. a layer of material with defects purposefully therein in order to obtain a desired refractive index.

TABLE 1

Refractive Index Materials (visible region)

| Material | Refractive Index |
| --- | --- |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$)-solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1naphthyl)-4,4' Diamine (NPB) | 1.7 |
| Polyamide-imide (PEI) | 1.6 |
| Zinc Sulfide (ZnS) | 2.3 + i(0.015) |
| Titanium Nitride (TiN) | 1.5 + i(2.0) |
| Chromium (Cr) | 2.5 + i(2.5) |
| Chromium (Cr) | 3.0 |
| Tin Sulfide (SnS) | 2.6 |
| Low Porous Si | 2.56 |
| Chalcogenide glass | 2.6 |
| Cerium Oxide ($CeO_2$) | 2.53 |
| Tungsten (W) | 2.5 |
| Gallium Nitride (GaN) | 2.5 |
| Manganese (Mn) | 2.5 |
| Niobium Oxide ($Nb_2O_3$) | 2.4 |
| Zinc Telluride (ZnTe) | 3.0 |
| Chalcogenide glass + Ag | 3.0 |
| Zinc, Sulfate (ZnSe) | 2.5-3.0 |
| Titanium Dioxide ($TiO_2$)-vacuum deposited | 2.43 |
| Hafnium Oxide ($HfO_2$) | 2.0 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica (SiO2) | 1.23 |
| Sputtered Silica (SiO2) | 1.47 |
| Vacuum Deposited Silica (SiO2) | 1.46 |
| Niobium Oxide ($Nb_2O_5$) | 2.1 |
| Aluminum (Al) | 2.0 + i(15) |
| Silicon Nitride (SiN) | 2.1 |

An OSC pigment in the form of a flake can have an average thickness between 0.5 and 5 microns and an average diameter between 5 and 50 microns. For the purpose of the present invention, the term average thickness is defined as the average value taken from at least three different thickness measurements and the term average diameter is defined as the average value taken from at least three different diameter measurements. It is appreciated that the flake can have an optional substrate attached thereto or be a freestanding flake. The substrate can be made from any material known to those skilled in the art, illustratively including metals, alloys, plastics, ceramics, glasses and combinations thereof, and may or may not be removable after the flake is produced.

It is appreciated that narrow band OSC pigments of the present invention can also be designed, manufactured and used to reflect ultraviolet (UV) light. Thus, narrow band OSC pigments of the present invention can be used to produce UV-reflecting coatings wherein UV-reflecting narrow band OSC pigments made are added to: (1) currently available paints, stains and the like; (2) coatings of the present invention containing narrow band OSC pigments which provide visible color; and/or (3) suitable clear binder(s) to produce a clear coating having UV protection capabilities. It is also appreciated that narrow band OSC pigments of the present invention can be used in telecommunication and optoelectronic devices.

Methods for producing the OSC pigment of the present invention include the sol gel process, electron gun evaporation of alternating layers, vacuum evaporation of alternating layers, thermal evaporation, CVD processes, electrochemical deposition and etching processes, high-vacuum vapor deposition and oxidation processes, sputtering of alternating layers, molecular-beam-epitaxy processes, thermal mechanical processing, chemical processing, poly-electrolyte multilayer deposition by "layer by layer" processing and/or combinations thereof.

A multilayer structure made from alternating layers of $TiO_2$ and $HfO_2$ was made by depositing over 29 layers. The $TiO_2$ has an index of reflection of 2.3 and $HfO_2$ has an index of refraction of 2.0. The multilayer structure was deposited on high quality glass and had a quarter wave stack with $\lambda_o=550$ nanometers. In addition, half layers of a high refractive index material ($0.5*\lambda_o/4n_H$) were added as a first and last layer in order to provide a low and high pass filter. The refractive index point of (2.0, 2.3) is plotted in FIG. 9B as an 'x' within a square.

Figure 10A:
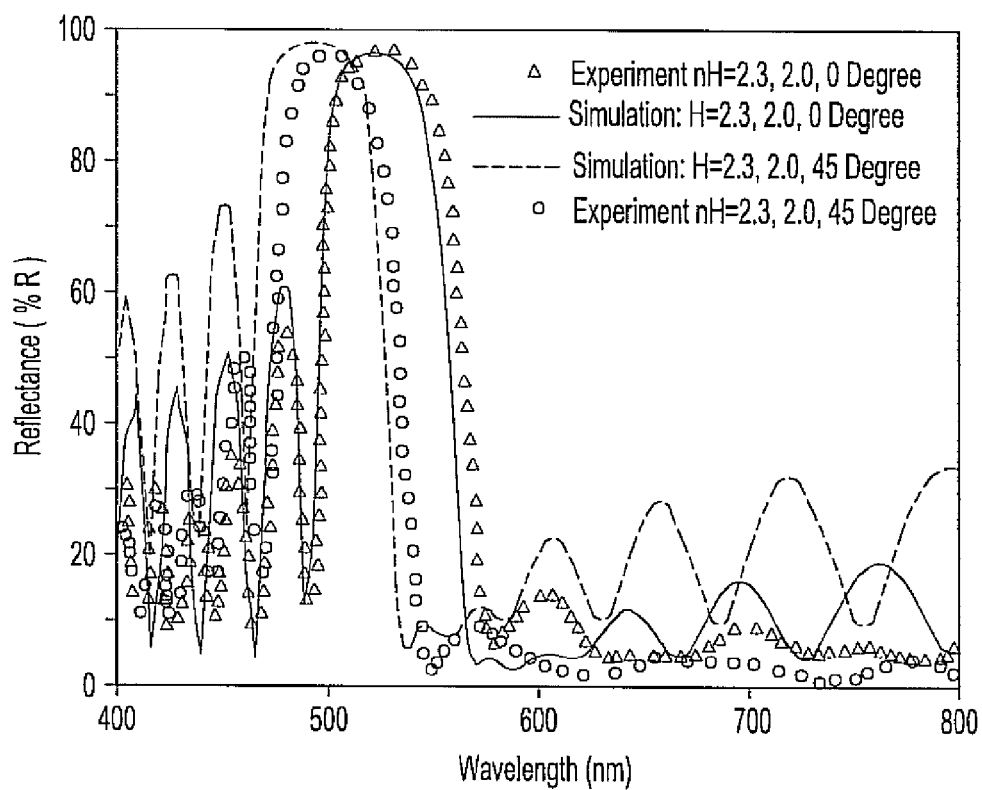
FIG. 10A is a graphical representation of a comparison between calculated and measured reflectance spectra of a 29 layer $TiO_2/HfO_2$ structure at angles of 0 and 45 degrees.

Material deposition of the alternating layers of $TiO_2$ and $HfO_2$ was performed using an electron-beam deposition method. Reflectance by the multilayer structure was measured at 0 degrees and 45 degrees using a UV-visible spectrophotometer, the results of which are shown in FIG. 10A. A comparison of the measured reflectance to a simulation of the reflectance for each angle is shown in FIG. 10A. As shown in this figure, the angular dispersion of the reflection peak was below 50 nanometers. In addition, the experimental behavior of the reflectance response agrees well with the simulated results. The appearance of the sample at 0 degrees and 45 degrees was a constant green color, in contrast to other structural color samples that were made without omnidirectional reflection bands.

Figure 10B:
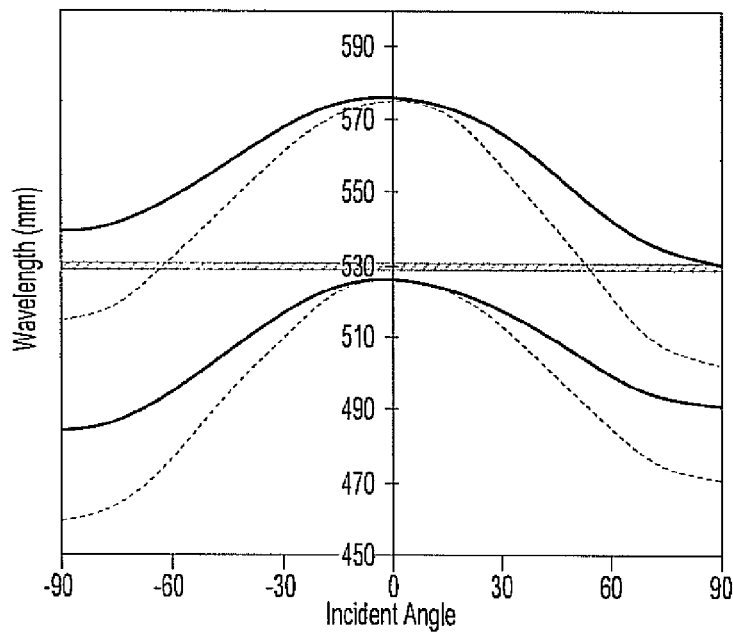
FIG. 10B is a graphical representation of the calculated reflectance band structure of refractive index pairs 2.5, 2.85 and 2.0, 2.3.

The corresponding calculated reflectance band structure is shown in FIG. 10B. The solid line represents a refractive index pair of 2.5, 2.85 while the dashed line represents a refractive index pair of 2.0, 2.3. Also shown in the figure is a narrow OSC pigment band for the refractive index pair 2.5, 2.85, which exists for all incident angles. For paint and/or coating applications, it is appreciated that the random orientation of pigment flakes in a base coat having 0-45° omnidirectionality is sufficient to provide a desired coloring affect.

Figure 11A:
FIG. 11A is a TEM image of a 29 layer $TiO_2/HfO_2$ structure.
Figure 11B:
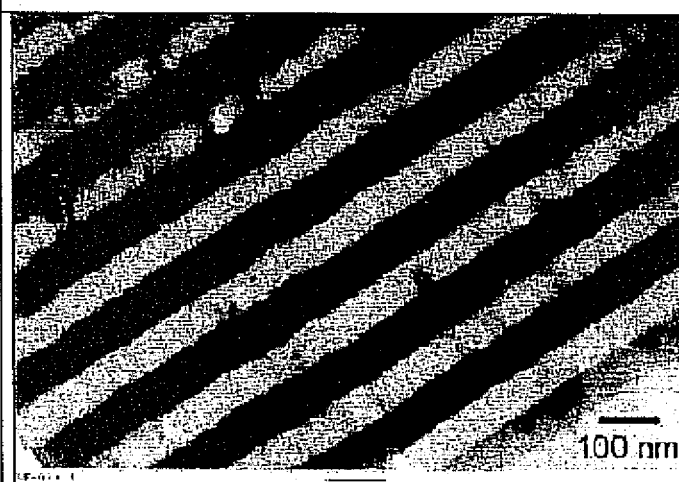
FIG. 11B is a higher magnification of the 29 layer $TiO_2/HfO_2$ structure shown in FIG. 10A.
Figure 11C:
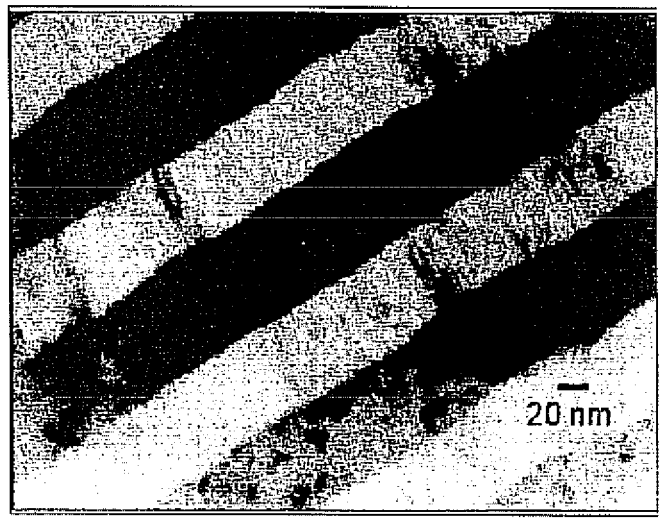
FIG. 11C is a higher magnification of the 29 layer $TiO_2/HfO_2$ structure shown in FIG. 11B.

Cross-sectional TEM images of the multilayer structures are shown in FIGS. 11A-11C. The alternating white and black layers correspond to the alternating $TiO_2$ and $HfO_2$ films, respectively.

Figure 12:
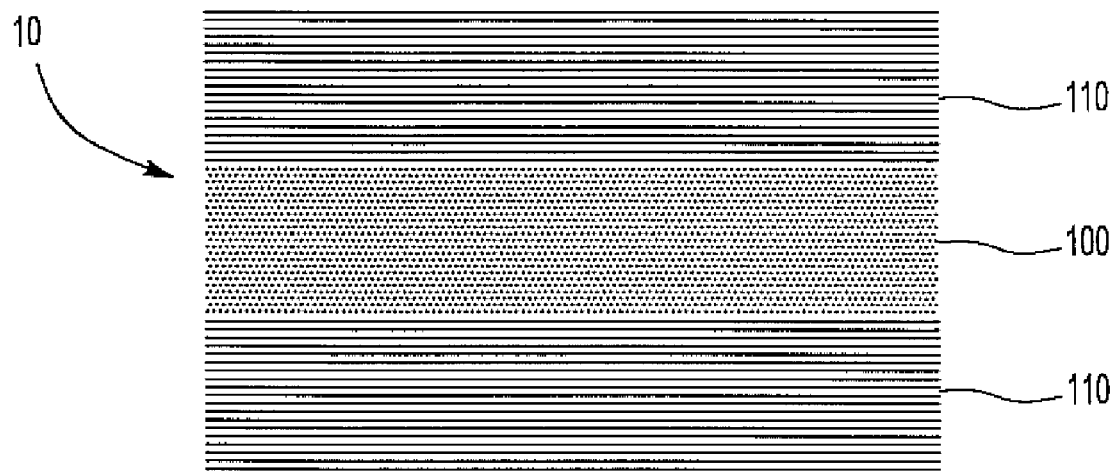
FIG. 12 is a schematic diagram of a multilayer structure of the present invention having an absorbing layer between a pair of omnidirectional structural color thin films.

OSC pigments can also be provided with an intervening layer between a pair of OSC multilayer films. For example, FIG. 12 illustrates an OSC pigment 10 having an absorbing layer 100 between a pair of OSC multilayer films 110. The absorbing layer 100 can retard and/or prevent transmission of light through the pigment 10 and thereby provide an OSC that is independent of a substrate (not shown) to which the OSC pigment 10 is applied. In some instances, the absorbing layer 100 has a high imaginary refractive index, for example and for illustrative purposes only, metals such as silver (Ag) and chromium (Cr), metalloids such as tellurium (Te) and germanium (Ge), carbon (C), and compounds such as titanium nitride (TiN) and indium arsenide (InAs).

Figure 13:
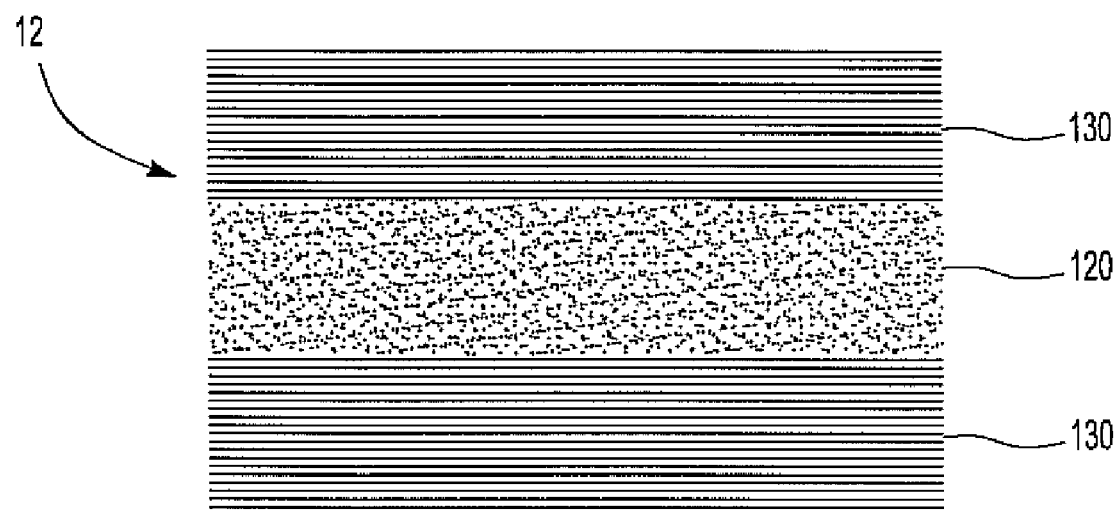
FIG. 13 is a schematic diagram of a multilayer structure of the present invention having a reflecting layer between a pair of omnidirectional structural color thin films.

In the alternative, FIG. 13 illustrates an OSC pigment 12 that has a reflecting 120 layer between a pair of OSC multilayer films 130. The reflecting layer 120 can increase reflection of light through the pigment 12 and thereby provide a brighter OSC. In some instances, the reflecting layer can be aluminum (Al), mica and the like. In this manner, an absorbing layer and/or reflecting layer can be employed to further tailor an OSC pigment and provide a desired color, color effect and the like. For example, an OSC pigment in which at least a portion of a plurality of OSC flakes have an intervening layer between a pair of OSC multilayer structures can be provided, the OSC pigment affording for an OSC paint that has an OSC that is generally independent of an underlying substrate, primer coat, etc., and/or an OSC paint that has an OSC with increased brightness when compared to an OSC pigment without the intervening layer.

EXAMPLE

Figure 14:
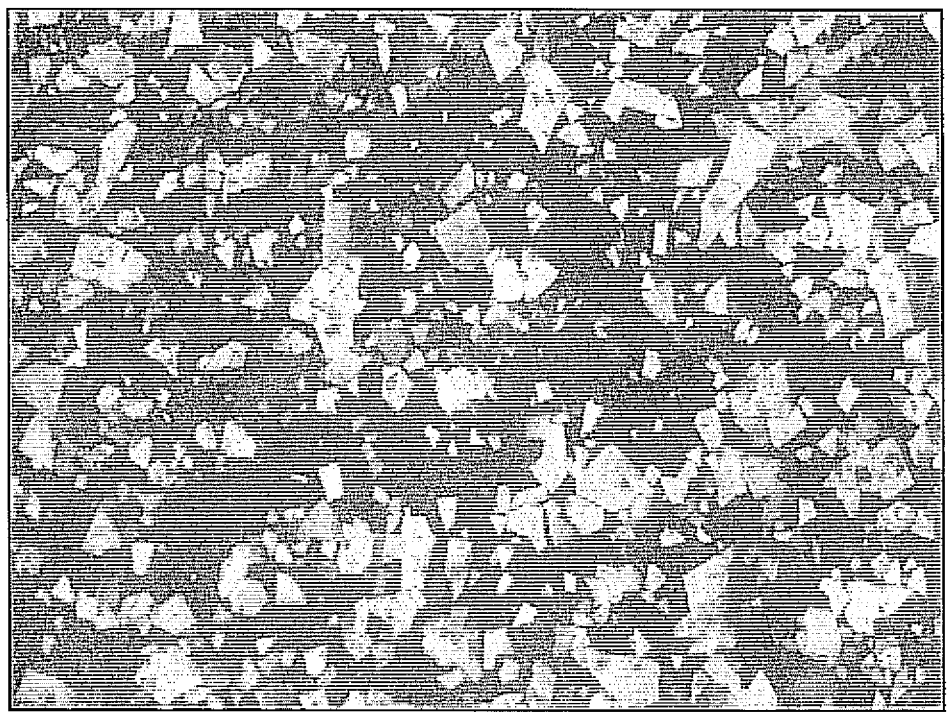
FIG. 14 is an optical microscopy image of a green omnidirectional structural color pigment in the form of flakes.

Optical microscopy of an OSC pigment having a green color is shown in FIG. 14. As observed in the figure, the OSC pigment is in the form of flakes. It is appreciated that although several of the flakes were oriented at an angle relative to a generally horizontal top surface or plane when the image shown in FIG. 14 was taken, all of the flakes generally had or exhibited the same color green with the uniform shade of gray illustrated by the flakes in the photograph providing evidence of such.

Figure 15:
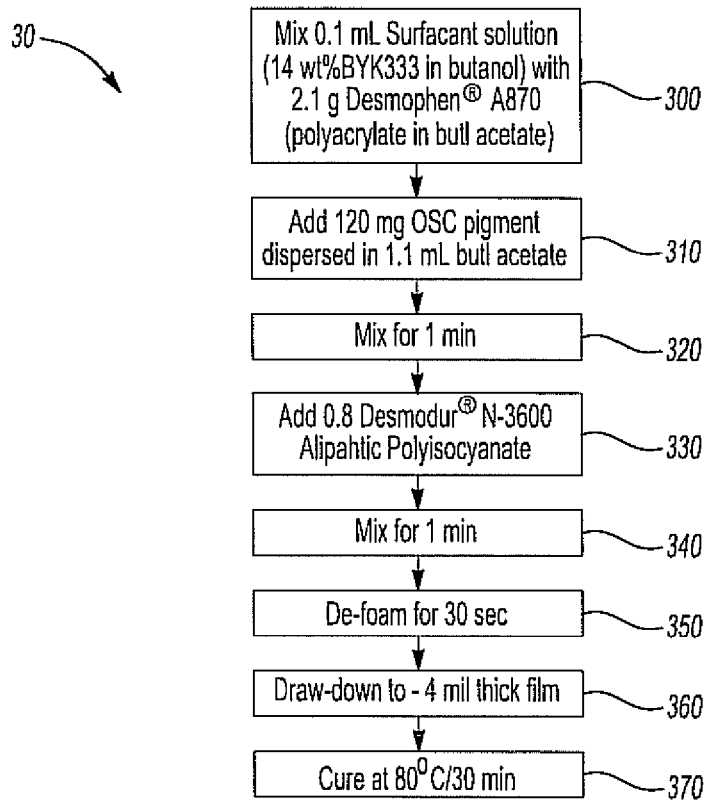
FIG. 15 is schematic illustration of a process or procedure for making an omnidirectional structural color paint according to an embodiment of the present invention.

Turning now to FIG. 15, a schematic representation illustrating the preparation/manufacture of an OSC paint is shown generally at reference numeral 30. As shown in the figure, 2.1 grams of a hydroxyl-functional polyacrylate resin (Desmophen® A870) n-butyl acetate was mixed with 0.1 milliliters of a surfactant solution (14 weight percent BYK-333 in butanol) at step 300. Thereafter, 120 milligrams of an OSC pigment dispersed in 1.1 milliliters of butyl acetate was added to the mixture of the polyacrylate and surfactant solution at step 310. This OSC pigment polymer mixture was then stirred for 1 minute at step 320, after which a polyfunctional aliphatic polyisocyanate resin (Desmodur® N-3600) was added at step 330 and mixed for an additional minute at step 340. The solution was defoamed for 0.5 minutes at step 350 and drawn down using a clearance of greater than 4 mils at step 360. The drawn down solution was then placed in an oven which was flushed with inert gas for 10 minutes and the material cured for 30 minutes at 80° C. at step 370.

Figure 16:
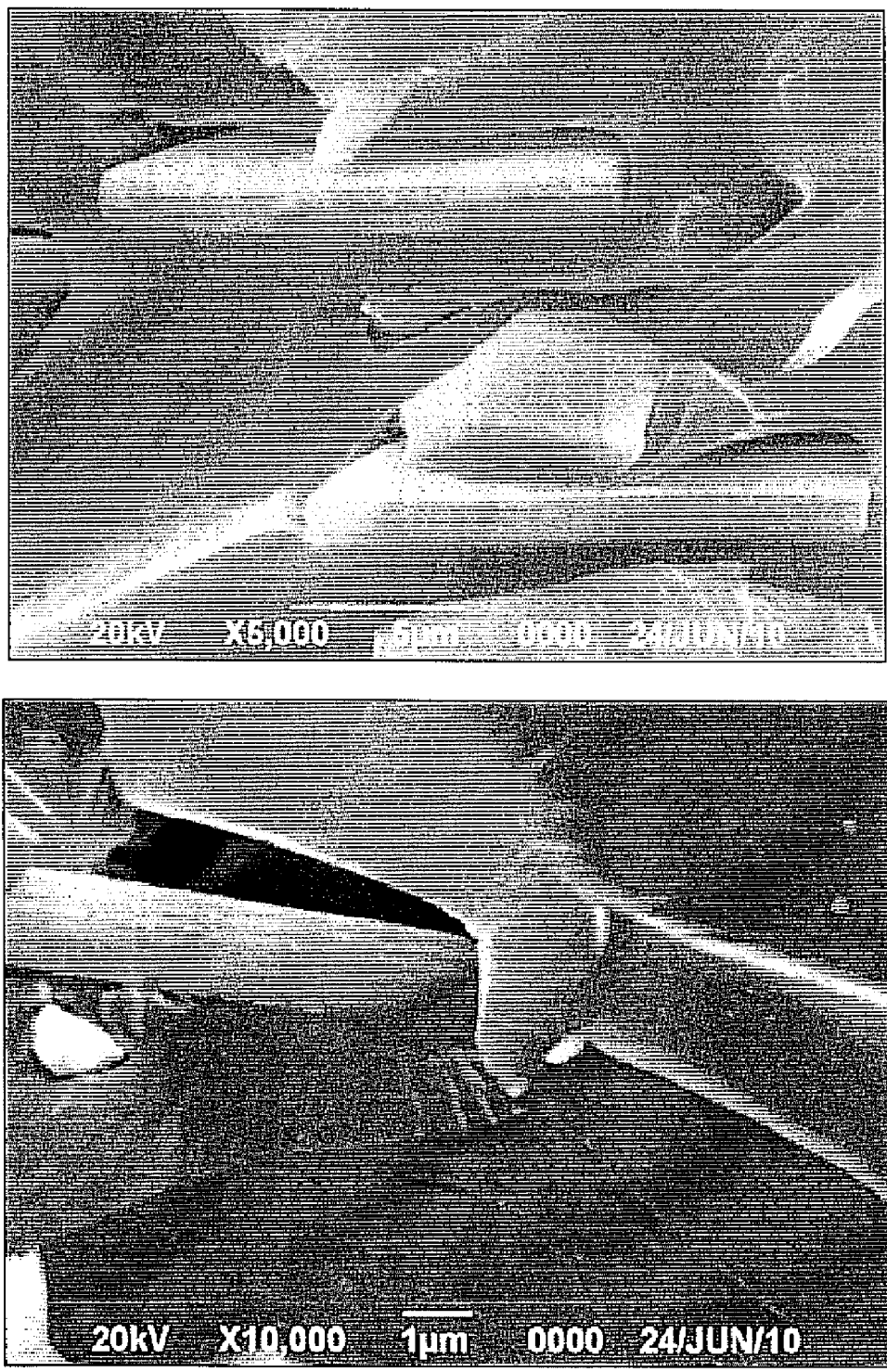
FIG. 16 is a pair of scanning electron microscopy images of an omnidirectional structural color paint according to an embodiment of the present invention with flakes of an omnidirectional structural color pigment dispersed within a binder.

FIG. 16 provides scanning electron microscopy images of the omnidirectional structural color pigments within the binder solution. The pigments were seen to be well distributed throughout the binder and each flake that was observed appeared to be relatively flat without any curving thereof. Omnidirectional structural color pigments of blue, green, and red were prepared and mixed with the binder solution described above. Thereafter, a given binder plus pigment solution was drawn down and cured. Each color provided bright structural color paints that exhibited omnidirectional properties. Stated differently, the solutions provided paints having a bright color that did not change color when viewed from angles between 0 to 45 degrees, 0 to 60 degrees, and/or 0 to 80 degrees.

In this manner, a paint composition that includes a binder and an omnidirectional structural color pigment is provided. The foregoing drawings, discussion, and description are illustrative of specific embodiments of the present invention, but they are not meant to be limitations upon the practice thereof. Numerous modifications and variations of the invention will be readily apparent to those of skill in the art in view of the teachings presented herein. It is the following claims, including all equivalents, which define the scope of the invention.

We claim:

1. A paint composition comprising:
a binder and an omnidirectional structural color pigment dispersed throughout said binder to form a paint, said omnidirectional structural color pigment made from a plurality of flakes having a multilayer structure with a first layer of first material having a first predefined thickness $d_H$ and a first index of refraction $n_H$ between 1.75 and 3, and a second layer of a second material having a second predefined thickness $d_L$ and a second index of refraction $n_H$ between 1 and 3:
said first predefined thickness $d_H$ and said second predefined thickness $d_L$ predefined such that said multilayer structure has a reflection band of less than 200 nanometers and a dispersion of a center wavelength $\Delta\lambda_c$ of said reflection band defined as:

$$\Delta\lambda_c = \lambda_c|_{\theta_0=0°} - \lambda_c|_{\theta_0=45°} = 2\left(\frac{n_H d_H}{1} + \frac{n_L d_L}{1} - \frac{n_H d_H}{\sqrt{1-\frac{n_0^2}{n_H^2}}} - \frac{n_L d_L}{\sqrt{1-\frac{n_0^2}{n_L^2}}}\right)$$

is less than 200 nm when said multilayer stack is viewed from 0 degrees and 45 degrees and where $\lambda_c$ at $\theta_0=0°$ is a center wavelength of said reflection band when said multilayer stack is viewed from 0°, $\lambda_c$ at $\theta_0=45°$ is a center wavelength of said reflection band when said multilayer stack is viewed from 45° and $n_0$ is a refractive index of a medium beyond said multilayer structure.

2. The paint composition of claim 1, wherein said binder is selected from a group consisting of a natural resin, a synthetic resin, a dry oil and water.

3. The paint composition of claim 2, wherein said synthetic resin is selected from a group consisting of an acrylic, a vinyl-acrylic, a vinyl acetate/ethylene, a polyurethane, a polyester, a melamine resin, an epoxy and combinations thereof.

4. The paint composition of claim 1, wherein said first layer and said second layer have a refractive index contrast between 0.2 and 1.0.

5. The paint composition of claim 4, wherein at least a portion of said plurality of flakes have an intervening layer between a pair of multilayer structures, said intervening layer selected from a group consisting of an absorbing layer and a reflecting layer.

6. The paint composition of claim 1, further comprising a solvent.

7. The paint composition of claim 6, wherein said paint is a spray paint.

8. The paint composition of claim 6, wherein said solvent is selected from a group consisting of an organic solvent and water.

9. The paint composition of claim 8, wherein said organic solvent is selected from a group consisting of an aliphatic, an aromatic, an alcohol, a ketone, white spirit, a petroleum distillate, an ester, a glycol ether and combinations thereof.

10. The paint composition of claim 1, further comprising an additive selected from a group consisting of a surface tension modifier, a flow modifier, a surface finish modifier, a wet edge modifier, a pigment stability modifier, an antifreeze modifier, a foam control modifier, a catalyst, a thickener, a stabilizer, an emulsifier, a texture modifier, an adhesion modifier, a flattener, a biocide and combinations thereof.

11. The paint composition of claim 1, further comprising a non-structural color pigment dispersed throughout said binder.

12. The paint composition of claim 1, wherein said structural color pigment is between 1 and 20 wt % of an overall composition.

13. The paint composition of claim 1, wherein said paint is a base coat.

14. The paint composition of claim 1, wherein said paint is a base coat of a self-stratifying paint coating.

* * * * *

UNITED STATES PATENT AND TRADEMARK OFFICE
CERTIFICATE OF CORRECTION

PATENT NO.         : 8,323,391 B2                                  Page 1 of 1
APPLICATION NO.    : 12/974606
DATED              : December 4, 2012
INVENTOR(S)        : Debasish Banerjee et al.

It is certified that error appears in the above-identified patent and that said Letters Patent is hereby corrected as shown below:

In the Specification:

Column 3, line 31, Delete "0.2%:", Insert -- 0.2%; --

Column 5, line 60, Delete "Usina", Insert -- Using --

Signed and Sealed this
Sixth Day of January, 2015

Michelle K. Lee
*Deputy Director of the United States Patent and Trademark Office*